(12) United States Patent
Zou et al.

(10) Patent No.: US 11,846,719 B2
(45) Date of Patent: Dec. 19, 2023

(54) ANTI-INTERFERENCE MICROWAVE DETECTION MODULE AND ANTI-INTERFERENCE METHOD THEREOF

(71) Applicant: Gaodi Zou, Shenzhen (CN)

(72) Inventors: Gaodi Zou, Shenzhen (CN); Xin Zou, Shenzhen (CN)

(73) Assignee: Gaodi Zou, Shenzhen (CN)

( * ) Notice: Subject to any disclaimer, the term of this patent is extended or adjusted under 35 U.S.C. 154(b) by 186 days.

(21) Appl. No.: 16/878,621

(22) Filed: May 20, 2020

(65) Prior Publication Data

US 2021/0041527 A1 Feb. 11, 2021

(30) Foreign Application Priority Data

Aug. 5, 2019 (CN) .......................... 201910715087.3

(51) Int. Cl.
*G01S 7/03* (2006.01)
*G01S 7/35* (2006.01)
(Continued)

(52) U.S. Cl.
CPC ............. *G01S 7/03* (2013.01); *G01S 7/0232* (2021.05); *G01S 7/354* (2013.01); *G01S 13/583* (2013.01)

(58) Field of Classification Search
CPC .......... G01S 7/03; G01S 7/0232; G01S 7/354; G01S 13/583; G01S 7/023; G01S 7/4802; G01S 7/495; G01V 3/12
See application file for complete search history.

(56) References Cited

U.S. PATENT DOCUMENTS 5,442,812 A * 8/1995 Ishizaki .................... H01P 1/15
455/83
5,907,242 A * 5/1999 Gard .................. E21B 47/0232
455/286

(Continued)

OTHER PUBLICATIONS

Y. S. Koo, L. Ren, Y. Wang and A. E. Fathy, "UWB MicroDoppler Radar for human Gait analysis, tracking more than one person, and vital sign detection of moving persons," 2013 IEEE MTT-S International Microwave Symposium Digest (MTT), 2013, pp. 1-4, doi: 10.1109/MWSYM.2013.6697702. (Year: 2013).*

(Continued)

*Primary Examiner* — Vladimir Magloire
*Assistant Examiner* — Yonghong Li
(74) *Attorney, Agent, or Firm* — Raymond Y. Chan; David and Raymond Patent Firm

(57) ABSTRACT

An anti-interference microwave detection module processes frequency-selection for reducing the interferences from the electromagnetic radiation of the frequency bands different from the frequency band of the anti-interference microwave detection module in the environment to the echo signal of the anti-interference microwave detection module. A Doppler intermediate-frequency signal is trend processed to obtain a fluctuation signal. The characteristic parameter of the fluctuation of the fluctuation signal is corresponding to the characteristics of the movement of the object in the detection space, so that the anti-interference microwave detection module is able to completely reflect the characteristics of the movement of the object in the detection space and reduce the interferences of the electromagnetic radiation in the environment, including the interferences of the electromagnetic radiation of the same frequency band of the anti-interference microwave detection module, to the fluctuation signal.

45 Claims, 8 Drawing Sheets

(51) Int. Cl.
*G01S 13/58* (2006.01)
*G01S 7/02* (2006.01)

(56) References Cited

U.S. PATENT DOCUMENTS

| | | | | |
|---|---|---|---|---|
| 6,977,609 | B2* | 12/2005 | Pleva | G01S 7/354 |
| | | | | 342/28 |
| 2013/0005280 | A1* | 1/2013 | Leung | G01S 7/023 |
| | | | | 455/90.1 |
| 2015/0123842 | A1* | 5/2015 | Chang | G01S 7/35 |
| | | | | 342/200 |
| 2018/0263502 | A1* | 9/2018 | Lin | A61B 5/05 |

OTHER PUBLICATIONS

Simple LC Bandpass Filter Circuit Design & Calculations_ Electronics Notes.pdf; https://www.electronics-notes.com/articles/radio/rf-filters/constant-k-simple-bandpass-lc-rf-filter-design-calculations.php (Year: 2018 ).*

RLCcircuit_Wikipedia.pdf from https://en.wikipedia.org/wiki/RLC_circuit?msclkid=4556bea2cd6611ec942c628b7e6ae1f8 (Year: 2019).*

MOSFET_Wikipedia.pdf from https://en.wikipedia.org/wiki/MOSFET?msclkid=04f49d6acd7211eca04058cb90af98e1 (Year: 2019).*

Colpitte_oscillator_Wikipedia.pdf from https://en.wikipedia.org/wiki/Colpitts_oscillator?msclkid=327f0c80cd7211ec9b04cc8ba76a4182 (Year: 2019).*

Antenna (radio)—Wikipedia.pdf from https://web.archive.org/web/20181218155022/https://en.wikipedia.org/wiki/Antenna_(radio) (Year: 2018).*

Doppler effect—Wikipedia.pdf from https://web.archive.org/web/20181218152130/https://en.wikipedia.org/wiki/Doppler_effect (Year: 2018).*

RadarFundamentals.pdf from https://web.archive.org/web/20181024151319/http://faculty.nps.edu/jenn/seminars/radarFundamentals.pdf (Year: 2018).*

* cited by examiner

ANTI-INTERFERENCE MICROWAVE DETECTION MODULE AND ANTI-INTERFERENCE METHOD THEREOF

CROSS REFERENCE OF RELATED APPLICATION

This application is a non-provisional application that claims the benefit of priority under 35 U.S.C. § 119 to a Chinese application, application number CN201910715087.3, filed Aug. 5, 2019, which is incorporated herewith by reference in its entirety.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to the field of microwave detection and, in particular, to an anti-interference microwave detection module and anti-interference method thereof.

Description of Related Arts

With development of IOT (Internet of things), AI (artificial intelligence), intelligent home, and intelligent security have demanded higher and higher in the accuracy of the detection of the environment, especially the existence, movements, and characteristics of fine motions. Only when it is capable of obtaining detection results that are stable enough, it can offer accurate comparison basis for an intelligent terminal device. Here, radiological technologies, including microwave detection technologies based on Doppler Effect, are utilized as a critical key to connect and relate among humans and objects and have a unique advantage among the behavior detection and existence detection technologies. That is, it is able to detect moving object, such as a person's motion characteristics, movement characteristics, fine motion characteristics, and even heartbeat and breath characteristics, without invading his/her privacy. Therefore, such technology has a wide-ranging application prospect.

ISM (Industrial Scientific Medical) Bands, defined by ITU-R (ITU Radio communication Sector), are the bands, that do not require a license, opened for organizations of industry, science, and medical purposes. Major bands in the ISM bands opened by ITU-R and applied in microwave detection include 2.4 GHz, 5.8 GHz, 10.525 GHz, 24.125 GHz and etc. Corresponding microwave detectors in the bands need to be limited in a certain regulated emissive power (usually lower than 1 W) in order to reduce the interference to other radio devices. Although the definitions of the licenses of the bands could regularize the use of the bands and decrease the risk of interference among radio devices in different bands, nevertheless interferences among the same or close radio bands may have become more and more serious due to the usage and coverage increase of these radio bands under a limited band resource and license.

Besides, because radio technology also plays a key role in information transmission and communication, the anti-interference ability thereof has much to do with economical and national security. Hence, various international, national, and regional organizations have made several standards correspondingly, such as the RED Certificate for the European Union and the FCC Certificate for the United States. Namely, even if the microwave detector based on Doppler Effect utilizes license-free frequency bands, it still has to face the standards of various international, national, and regional organizations when the interference issue has become more and more serious. Especially, along with the development of the 5G high speed communication, the coverage of high frequency communication network and the diffusion of corresponding communication equipment will become higher and higher. This will certainly render congestions of the 5.8 GHz frequency band and the adjacent frequency bands. As a result, conventional microwave detectors that relatively popularly utilize 5.8 GHz frequency band will face more severe electromagnetic radiation interference and the certification standard for the microwave detector of 5.8 GHz will become stricter. For instance, the Radiated Susceptibility (RS) test according to the standard made by International Electrical Commission (IEC) has correspondingly raised the upper limit of the test frequency to 6 GHz.

A conventional microwave detector can, under an excitation of an excitation signal, emit at least a detecting wave beam in a detection space and receive an echo signal produced by an echo created by the detecting wave beam being reflected by at least an object in the detection space, so as to, based on the Doppler effect, produce a Doppler intermediate-frequency signal corresponding to the frequency difference of the excitation signal and the echo signal. Because the microwave detector can respond to the electromagnetic wave signals of all bands, electromagnetic wave signals of various frequency bands in the detection space can be responded by the microwave detector and affect the echo signal and, further, the Doppler intermediate-frequency signal, which will influence the accuracy of the microwave detector. In addition, the Doppler intermediate-frequency signal can also be interfered directly by the electromagnetic environment in the detection space. That is to say, the echo signal and the Doppler intermediate-frequency signal can both be interfered by the electromagnetic environment, especially electromagnetic radiation of lower bands, in the detection space. On one hand, the Doppler intermediate-frequency signal reflecting human body movements is in a lower band, so it is difficult to completely eliminate the interferences of lower band electromagnetic radiations through filtering. On the other hand, lower band electromagnetic radiations have stronger anti-attenuation characteristic and bring stronger influences to the echo signal and the Doppler intermediate-frequency signal.

A conventional microwave detector, based on filtering for the Doppler intermediate-frequency signal, filters out the signals of lower and higher frequency from the Doppler intermediate-frequency signal, which filters out part of the lower frequency signals that reflects human body movement from the Doppler intermediate-frequency signal and renders the feedback of the microwave detector to the human body movement incomplete. Besides, since the Doppler signal is generated based on the echo signal that is already affected by environmental electromagnetic radiations and the Doppler signal itself is also affected by electromagnetic radiations of low bands, the filtering for the Doppler intermediate-frequency signal cannot restore the feedback of the Doppler intermediate-frequency signal to the human body movement. Namely, the feedback of a conventional microwave detector to the human body movement is incomplete and inaccurate and will be further limited due to the more and more complex electromagnetic environment. Accordingly, a conventional microwave detector is unlikely to pass the current RS test.

SUMMARY OF THE PRESENT INVENTION

An object of the present invention is to provide an anti-interference microwave detection module and anti-interference method thereof, wherein the anti-interference microwave detection module utilizes means of frequency-selection to reduce the interferences from the electromagnetic radiation of the frequency bands different from the frequency band of the anti-interference microwave detection module in the environment to the echo signal of the anti-interference microwave detection module and, especially, reduce the interference from the lower band electromagnetic radiations (e.g. electromagnetic radiation of 1 GHz and below) that have stronger anti-attenuation characteristic to the echo signal of the anti-interference microwave detection module, so as to enhance the detection accuracy of the anti-interference microwave detection module.

Another object of the present invention is to provide an anti-interference microwave detection module and anti-interference method thereof, wherein the anti-interference microwave detection module obtains a fluctuation signal through trend processing the Doppler intermediate-frequency signal, so that because the characteristic parameter of the fluctuation of the fluctuation signal is corresponding to the characteristics of the movement of the object in the detection space, it allows the anti-interference microwave detection module to completely reflect the characteristics of the movement of the object in the detection space.

Another object of the present invention is to provide an anti-interference microwave detection module and anti-interference method thereof, wherein the anti-interference microwave detection module obtains the fluctuation signal through trend processing the Doppler intermediate-frequency signal, so as to reduce the interferences of the electromagnetic radiations in the environment, including the electromagnetic radiation of the same frequency band to the anti-interference microwave detection module, to the fluctuation signal, in order to facilitate the accuracy of the detection of the anti-interference microwave detection module to the movements of the object in the detection space.

Another object of the present invention is to provide an anti-interference microwave detection module and anti-interference method thereof, wherein the anti-interference microwave detection module further low-pass filtering processes the fluctuation signal to reduce the interferences from the movements of the objects other than the movement of human body in the detection space to the fluctuation signal and the interference from the medium high frequency electromagnetic radiation (e.g. electromagnetic radiation of 1 Hz and above) in the environment to the fluctuation signal, which helps to enhance the accuracy of the feedback of the fluctuation signal to the human body movements.

Another object of the present invention is to provide an anti-interference microwave detection module and anti-interference method thereof, wherein the anti-interference microwave detection module is able to accurately detect the movement characteristics, such as movement, fine motion, micro action, breath, palpitation, and etc., of human body(ies) in the detection space based on the frequency-selection processing of the echo signal, the trend processing of the Doppler intermediate-frequency signal, and the low-pass filtering processing of the fluctuation signal.

Another object of the present invention is to provide an anti-interference microwave detection module and anti-interference method thereof, wherein the anti-interference microwave detection module includes a frequency-selection unit configured to form and define a frequency-selection network in the anti-interference microwave detection module, wherein the frequency-selection network is a circuit that selectively allows the electrical signal of a specific frequency interval to pass through, wherein the specific frequency interval contains the frequency interval of the frequency of the excitation signal, so that the frequency-selection network can be utilized to frequency-selection process the echo signal and to reduce the interferences of the electromagnetic radiations having different frequency bands then the anti-interference microwave detection module to the echo signal of the anti-interference microwave detection module.

Another object of the present invention is to provide an anti-interference microwave detection module and anti-interference method thereof, wherein the frequency-selection network is configured that the echo signal that is the frequency-selection processed by the frequency-selection network is greater than 1 GHz, so that the frequency-selection network can be utilized for the frequency-selection process of the echo signal to reduce the interference of lower band electromagnetic radiations to the echo signal and helping to lower the accuracy requirement of the frequency-selection unit as the anti-interference microwave detection module with a frequency band of 5.8G, which can therefore lower the cost of the anti-interference microwave detection module.

Another object of the present invention is to provide an anti-interference microwave detection module and anti-interference method thereof, wherein the frequency-selection unit is configured to form and define at least a resonant circuit in the anti-interference microwave detection module, so as to utilize the resonance characteristics of the resonant circuit to selectively allow the electrical signal of a specific frequency interval to pass through and, in other words, to form and define the frequency-selection network, which can reduce the interferences to the echo signal by the electromagnetic radiations which have different frequency bands than that of the anti-interference microwave detection module in the environment.

Another object of the present invention is to provide an anti-interference microwave detection module and anti-interference method thereof, wherein the resonant circuit is grounded, so as to reduce the range of frequency-selection for the resonant circuit to the electromagnetic radiations corresponding to the frequency of the anti-interference microwave detection module in the environment through increasing the quality factor of the resonant circuit, which helps to reduce the interference to the echo signal from the electromagnetic radiations having frequency bands different from that of the anti-interference microwave detection module in the environment.

Another object of the present invention is to provide an anti-interference microwave detection module and anti-interference method thereof, wherein through an equivalent inductor, the feed point of the conventional microwave detector is grounded to form the resonant circuit and a circuit structure grounding the resonant circuit, so that a frequency-selection processing for the echo signal is able to be executed based on the structure of the conventional microwave detector easily in a simple and low cost manner.

Another object of the present invention is to provide an anti-interference microwave detection module and anti-interference method thereof, wherein the frequency-selection unit is configured to form at least one high pass filter in the anti-interference microwave detection module, so that the frequency-selection process of the echo signal is executed through a simple high pass filtering, so as to form and define the frequency-selection network to reduce the interferences from the electromagnetic radiations with lower bands that have higher anti-attenuation property to the echo signal easily, simply, and cheaply.

Another object of the present invention is to provide an anti-interference microwave detection module and anti-interference method thereof, wherein the anti-interference microwave detection module utilizes at least a low pass filter to trend process the Doppler intermediate-frequency signal and to low-pass filtering process the fluctuation signal in an easy, feasible and inexpensive manner.

Another object of the present invention is to provide an anti-interference microwave detection module and anti-interference method thereof, wherein the anti-interference microwave detection module utilizes at least one Butterworth low pass filter to perform trend processing to the Doppler intermediate-frequency signal and low-pass filtering processing to the fluctuation signal, so as to use the integral characteristic of the Butterworth low pass filter to present the interferences rendered by high speed movements of small substances (e.g. grass rustling, rain, and etc.) in the Doppler intermediate-frequency signal into a short small fluctuation in the fluctuation signal correspondingly while trend processing the Doppler intermediate-frequency signal, which can then eliminate the interferences rendered by high speed movements of small substances in the detection space to the fluctuation signal based on the conventional signal background noise process technology, and enhance the accuracy of the feedback of the fluctuation signal to the movements of human body(ies) or other object(s) in the detection space.

Another object of the present invention is to provide an anti-interference microwave detection module and anti-interference method thereof, which can eliminate the interferences rendered by high speed movements of small substances in the detection space to the fluctuation signal through the low-pass filtering processing to the fluctuation signal and the trend processing to the Doppler intermediate-frequency signal by means of the Butterworth low pass filter, such that the anti-interference microwave detection module can also be utilized in detecting moving objects (e.g. vehicles and etc.) in an outdoor environment.

Another object of the present invention is to provide an anti-interference microwave detection module and anti-interference method thereof, wherein, based on the frequency-selection processing to the echo signal, the trend processing to the Doppler intermediate-frequency signal and the low-pass filtering processing to the fluctuation signal, the anti-interference microwave detection module is able to avoid the interference of the test signal when gradually increasing the frequency and utilizing amplitude modulation signal in the RS test, such that the anti-interference microwave detection module is able to achieve the anti-interference ability certified by current RS test.

According to another aspect of the present invention, the present invention provides an anti-interference method of an anti-interference microwave detection module, comprising the steps of:

S1: emitting and transmitting at least a detecting wave beam in a detection space under an excitation of an excitation signal;

S2: receiving an echo formed through a reflection of the detecting wave beam by at least one object in the detection space and generating an echo signal;

S3: frequency-selection processing the echo signal; and

S4: frequency-mixing wave detecting the excitation signal and the echo signal to generate a Doppler intermediate-frequency signal corresponding to the frequency difference of the excitation signal and the echo signal based on the Doppler Effect, wherein the Doppler intermediate-frequency signal is responsive to a movement of the at least one object in the detection space.

In one embodiment, according to the step S3, the echo signal is frequency-selection processed by at least a frequency-selection network, wherein the frequency-selection network selectively allows electrical signals of a specific frequency interval containing the frequency of the excitation signal to pass through.

In one embodiment, the frequency-selection network comprises at least a resonant circuit so as for forming the frequency-selection network through the selection of the electrical signal in a specific frequency interval by the resonant circuit.

In one embodiment, the frequency-selection network comprises at least a wave filter so as for forming the frequency-selection network through a characteristic selection of the electrical signal in a specific frequency interval by the wave filter.

In one embodiment, according to the step S3, the resonant circuit is grounded.

In one embodiment, according to the step S3, the wave filter is a high pass filter formed by at least a resonant circuit, so as for frequency-selection processing the echo signal thereby.

In one embodiment, in the step S3, the frequency-selection processing of the echo signal satisfies that the frequency of the frequency-selection processed echo signal is larger than 1 GHz.

In one embodiment, the anti-interference method further comprises the following steps:

S5: trend processing the Doppler intermediate-frequency signal in order to obtain a fluctuation signal based on the trend variation of the Doppler intermediate-frequency signal, such that the characteristic parameter of the fluctuation of the fluctuation signal is corresponding to the characteristic of the movement of the object in the detection space; and S6: low-pass filtering the fluctuation signal.

In one embodiment, in the step S6, the low-pass filtering processing of the fluctuation signal satisfies that the frequency of the low-pass filtering processed fluctuation signal is lower than the frequency of the actual power supply network.

In one embodiment, in the step S6, the low-pass filtering processing of the fluctuation signal satisfies that the frequency of the low-pass filtering processed fluctuation signal is lower than 25 Hz.

In one embodiment, the anti-interference method, before the step S5, further includes a step of amplifying the Doppler intermediate-frequency signal.

In one embodiment, according to the step S6, the fluctuation signal is low-pass filtering processed by at least a low pass filter.

In one embodiment, in the step S5, the trend processing to the amplitude variation of the Doppler intermediate-frequency signal is performed by envelope processing the Doppler intermediate-frequency signal.

In one embodiment, according to the step S5, the Doppler intermediate-frequency signal is trend processed by at least a Butterworth low pass filter.

In one embodiment, according to the step S6, the fluctuation signal is low-pass filtering processed by the Butterworth low pass filter at the same time.

In one embodiment, the anti-interference method, after the step S6, further includes a step of amplifying the fluctuation signal.

According to another aspect of the present invention, the present invention provides an anti-interference microwave detection module, comprising:

an oscillating circuit, configured to receive a power supply and generate an excitation signal;

an emission unit, coupled to the oscillating circuit so as to be driven by the excitation signal to emit and transmit a detecting wave beam to a detection space;

a receiving unit, receiving an echo signal formed by a reflection of the detecting wave beam from at least an object in the detection space and generating an echo signal;

a frequency-mixing wave detection unit, coupled to the oscillating circuit and the receiving unit, arranged for frequency-mixing wave detecting the excitation signal and the echo signal and generating a Doppler intermediate-frequency signal corresponding to a frequency difference of the excitation signal and the echo signal based on the Doppler effect, wherein the Doppler intermediate-frequency signal is responsive to a movement of the object in the detection space; and a frequency-selection unit, coupled between the frequency-mixing wave detection unit and the receiving unit, arranged form and define at least a frequency-selection network between the frequency-mixing wave detection unit and the receiving unit, wherein the echo signal is frequency selected by frequency-selection network and transmitted to the frequency-mixing wave detection unit through the frequency-selection unit, so as to reduce an interference of electromagnetic radiations with frequency bands different from the excitation signal in an environment with respect to the Doppler intermediate-frequency signal.

In one embodiment, the receiving unit comprises a radiation source and a reference ground, wherein the radiation source and the reference ground are spacingly arranged in order to equivalently form and define a capacitor C0, wherein the radiation source has a feed point and the frequency-selection unit comprises at least one equivalent capacitor and at least one equivalent inductor, wherein at least one of the at least one equivalent capacitor is electrically connected between the frequency-mixing wave detection unit and the feed point of the radiating source, wherein the circuit coupling structure of the frequency-selection unit arranged between the receiving unit and the frequency-mixing wave detection unit satisfies that the equivalent capacitor, the equivalent inductor and the capacitor C0 are capable of forming and defining the frequency-selection network thereamong.

In one embodiment, the frequency-selection network formed and defined by the circuit coupling structure of the frequency-selection unit between the receiving unit and the frequency-mixing wave detection unit satisfies that the frequency of the echo signal processed by the frequency-selection processing is greater than 1 Ghz and includes an frequency interval within the frequency band of the excitation signal.

In one embodiment, the frequency-selection unit comprises one of the at least one equivalent capacitor and one of the at least one equivalent inductor, wherein an end of the equivalent capacitor is electrically connected with the frequency-mixing wave detection unit and the other end of the equivalent capacitor is electrically connected with an end of the equivalent inductor, wherein the other end of the equivalent inductor is electrically connected with the feed point of the receiving unit.

In one embodiment, the frequency-selection unit further comprises a resistor electrically connected with the equivalent inductor in parallel.

In one embodiment, the frequency-selection unit further comprises a resistor, electrically connected between the equivalent inductor and the feed point, so as to be electrically connected with the equivalent inductor and the equivalent capacitor in series.

In one embodiment, the frequency-selection unit further comprises another equivalent capacitor electrically connected with the equivalent inductor in parallel.

In one embodiment, the frequency-selection unit further comprises a resistor electrically connected with the equivalent inductor in parallel.

In one embodiment, the frequency-selection unit comprises one of the at least one equivalent capacitor and one of the at least one equivalent inductor, wherein an end of the equivalent capacitor is electrically connected with the frequency-mixing wave detection unit and the other end of the equivalent capacitor is electrically connected with the feed point of the receiving unit, wherein an end of the equivalent inductor is electrically connected with the feed point of the receiving unit and the other end of the equivalent inductor is grounded.

In one embodiment, the equivalent inductor is equivalently formed by a resistor.

In one embodiment, the frequency-selection unit further comprises a resistor electrically connected with the equivalent inductor in parallel.

In one embodiment, the frequency-selection unit further comprises another equivalent capacitor electrically connected with the equivalent inductor in parallel.

In one embodiment, the frequency-selection unit further comprises another equivalent capacitor electrically connected between the equivalent capacitor and the feed point and electrically connected with the equivalent inductor in series.

In one embodiment, the frequency-selection unit further comprises a resistor, wherein the resistor, the another equivalent capacitor and the equivalent inductor are orderly and electrically connected in series.

In one embodiment, the frequency-selection unit further comprises another equivalent inductor, which is electrically connected between the equivalent capacitor and the feed point and electrically connected with the equivalent capacitor in series.

In one embodiment, the frequency-selection unit further comprises another equivalent inductor, which is electrically connected between the equivalent inductor and the feed point and electrically connected with the equivalent capacitor in series.

In one embodiment, the frequency-selection unit further comprises another equivalent inductor, which has one end grounded and another end electrically connected between the equivalent capacitor and the equivalent inductor.

In one embodiment, the emission unit and the receiving unit are integrated.

According to an embodiment, the anti-interference microwave detection module further comprises a fluctuation signal conversion unit, which is electrically connected with the frequency-mixing wave detection unit and configured to convert the Doppler intermediate-frequency signal into a fluctuation signal based on the variation tendency of the Doppler intermediate-frequency signal, so that the characteristic parameter of the fluctuation of the fluctuation signal is corresponding to the characteristic of the movement of the object in the detection space.

In one embodiment, the fluctuation signal conversion unit is configured to satisfy that the frequency of the fluctuation signal converted by the fluctuation signal conversion unit is less than 50 Hz.

In one embodiment, the fluctuation signal conversion unit is configured to satisfy that the frequency of the fluctuation signal converted by the fluctuation signal conversion unit is less than 25 Hz.

In one embodiment, the fluctuation signal conversion unit is configured to be at least a Butterworth low pass filter.

In one embodiment, the anti-interference microwave detection module further comprises at least an amplification unit, arranged between the frequency-mixing wave detection unit and the fluctuation signal conversion unit, so as for amplifying the Doppler intermediate-frequency signal.

In one embodiment, the anti-interference microwave detection module further comprises a control unit and an execution unit, wherein the control unit is electrically connected between the execution unit and the fluctuation signal conversion unit, so as for receiving the fluctuation signal and controlling the execution unit according to the fluctuation signal.

In one embodiment, at least one of the amplification units is arranged between the fluctuation signal conversion unit and the control unit, so as for amplifying the fluctuation signal.

In one embodiment, the equivalent capacitor is equivalently formed by intervally spaced micro strip lines.

In one embodiment, the equivalent inductor is equivalently formed by micro strip lines.

In one embodiment, the equivalent inductor is equivalently formed by a resistor.

In one embodiment, the oscillating circuit comprises a triode circuit processor, a first capacitor, a second capacitor, a third capacitor, a first resistor, and a second resistor, wherein the triode circuit processor has a first connection terminal, a second connection terminal, and a grounded third connection terminal, wherein the first capacitor is electrically connected between the first connection terminal and the second connection terminal of the triode circuit processor, wherein the second capacitor is electrically connected between the second connection terminal and the third connection terminal of the triode circuit processor, wherein the third capacitor is electrically connected between the first connection terminal and the third connection terminal of the triode circuit processor, wherein the second resistor is electrically connected between the first connection terminal and the second connection terminal of the triode circuit processor, wherein one end of the first resistor is electrically connected with the first connection terminal of the triode circuit processor so as to allow the oscillating circuit to provide the excitation signal at the second connection terminal of the triode circuit processor when the other end of the first resistor is powered in the oscillating circuit.

In one embodiment, the oscillating circuit comprises a triode circuit processor, a first capacitor, a second capacitor, a third capacitor, a first resistor, a second resistor, a third resistor, and a inductor wherein the triode circuit processor has a first connection terminal, a second connection terminal, and a grounded third connection terminal, wherein the first capacitor is electrically connected between the first connection terminal and the third connection terminal of the triode circuit processor, wherein an end of the second capacitor is electrically connected between the first connection terminal and the other end of the second capacitor is grounded, wherein an end of the third capacitor is grounded, wherein the first resistor is electrically connected between the first connection terminal and the second connection terminal of the triode circuit processor, wherein one end of the second resistor is electrically connected with the second connection terminal of the triode circuit processor and the other end of the second resistor is grounded, wherein one end of the third resistor is electrically connected with the third connection terminal of the triode circuit processor and the other end of the third resistor is grounded, wherein one end of the inductor is electrically connected with the first connection terminal of the triode circuit processor so as to allow the oscillating circuit to provide the excitation signal at the third connection terminal of the triode circuit processor when the other end of the inductor is powered in the oscillating circuit.

In one embodiment, the triode circuit processor is embodied as a triode, wherein the first connection terminal is a collector of the triode, the second connection terminal is a base of the triode, and the third connection terminal is an emitter of the triode.

In one embodiment, the triode circuit processor is embodied as a MOS transistor, wherein the first connection terminal is a drain electrode of the MOS transistor, the second connection terminal is a grid of the MOS transistor, and the third connection terminal is a source electrode of the MOS transistor.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
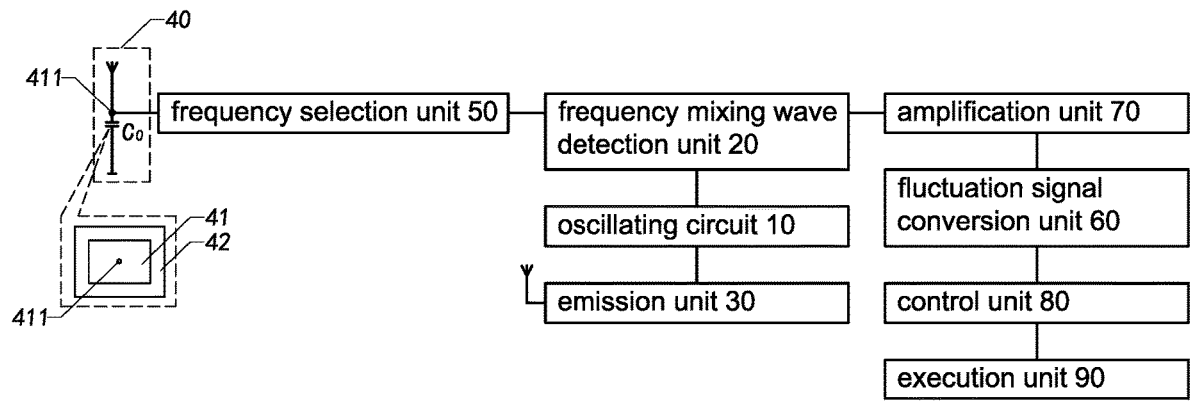
FIG. 1 is a block diagram of an anti-interference microwave detection module according to a preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. just indicate relations of direction or position are based on the relations of direction or position shown in the appended drawings, which is only to facilitate descriptions of the present invention and to simplify the descriptions, rather than to indicate or imply that the referred device or element must apply specific direction or to be operated or configured in specific direction. Therefore, the above-mentioned terminologies shall not be interpreted as confine to the present invention.

It is understandable that the term "a" should be understood as "at least one" or "one or more". In other words, in one embodiment, the number of an element can be one and in other embodiment the number of the element can be greater than one. The term "a" is not construed as a limitation of quantity.

The present invention provides an anti-interference microwave detection module and anti-interference method, wherein the anti-interference method comprises the steps of:

S1: emitting and transmitting at least a detecting wave beam in a detection space under an excitation of an excitation signal;

S2: receiving an echo formed through a reflection of the detecting wave beam by at least one object in the detection space and generating an echo signal;

S3: frequency-selection processing the echo signal; and

S4: frequency mixing wave detecting the excitation signal and the echo signal to generate a Doppler intermediate-frequency signal corresponding to the frequency difference of the excitation signal and the echo signal based on Doppler Effect, wherein the Doppler intermediate-frequency signal is responsive to a movement of the at least one object in the detection space.

In particular, it is appreciated that, in the step S3, the frequency-selection processing of the echo signal should be interpreted as selecting a frequency interval of the echo signal containing the frequency band of the excitation signal. For example, by processing a wave filtering a portion or all of the frequency intervals of the echo signals which are different from frequency bands of the excitation signals, the portion or all the frequency intervals of the echo signals which are different from the frequency bands of the excitation signals are eliminated, so as to reduce the interference of the electromagnetic radiations of the frequency bands that are different from the excitation signals in the environment with respect to the echo signal.

Those who skilled in the art would understand that, based on Doppler effect, when the frequency of the excitation signal is $f_0$, the frequency (f) of the Doppler intermediate-frequency signal corresponding to the movement of the object in the detection space follows $f=f_0 \cdot v/c$, wherein the value v is the velocity component of the moving speed of the object in the detection space with respect to the anti-interference microwave detection module towards the anti-interference microwave detection module, while the value c is a transmission speed of the electromagnetic wave in the environment. Therefore, the frequency of the Doppler intermediate-frequency signal corresponding to the movement of an object or human body in the detection space is at a lower band. In other words, the signaling frequency in the Doppler intermediate-frequency signal corresponding to the movement of an object or human body is at a lower band. An electromagnetic radiation of a lower band has a higher anti-attenuation characteristic. That is the electromagnetic radiations of lower bands in the environment (e.g. electromagnetic radiations produced by a power supply network and etc.) have stronger interference to the echo signal and the Doppler intermediate-frequency signal.

Accordingly, in the step S3, preferably, the frequency-selection processing for the echo signal is conducted through filtering the echo signal to eliminate the low frequency intervals that are different from the frequency band of the excitation signal in the echo signal, such that the interferences to the echo signal rendered by low frequency electromagnetic radiations that have stronger anti-attenuation characteristic can be reduced. Therefore, it can enhance the accuracy of the feedback of the Doppler intermediate-frequency signal in reflecting the movement of the object in the detection space in the step S4 as the Doppler intermediate-frequency signal is generated based on the frequency difference of the excitation signal and the echo signal according to the Doppler Effect. In other words, it enhances the resistance of the anti-interference microwave detection module to electromagnetic radiation interference.

Further, the anti-interference method also includes the following steps:

S5: trend processing the Doppler intermediate-frequency signal in order to obtain a fluctuation signal based on a trend variation of the Doppler intermediate-frequency signal, such that a characteristic parameter of the fluctuation of the fluctuation signal is corresponding to one or more characteristics of a movement of the at least one object in the detection space; and S6: low-pass filtering the fluctuation signal.

It is worth mentioning that the Doppler intermediate-frequency signal is corresponding to the movement of the object in the detection space. According to the frequency formula of the Doppler intermediate-frequency signal, $f=f_0 \cdot v/c$, it can be known that, according to the step S5, when the v value of the object of movement is positive (e.g. the velocity of the object moving away from the anti-interference microwave detection module is positive), the frequency (f) of the Doppler intermediate-frequency signal is positive. When the v value of the object is zero, the frequency (f) of the Doppler intermediate-frequency signal is zero. When the value of the object is negative (e.g. the velocity of the object moving toward the anti-interference microwave detection module is negative), the frequency (f) of the Doppler intermediate-frequency signal is negative. Therefore, the trend processing of the Doppler intermediate-frequency signal can obtain the fluctuation signal corresponding to the movement of the object based on the changes/variations of the movement of the object in a given time. For instance, if the corresponding object is a human body, a chest expansion movement of the human body facing the anti-interference microwave detection module in the detection space is corresponding to one fluctuation in the fluctuation signal. Hence, the characteristic parameter of the fluctuation in the fluctuation signal is corresponding to the characteristic of the movement of the object in the detection space.

It is appreciated that the trend processing for the Doppler intermediate-frequency signal includes, but not limited to, the trend processing to the frequency variation of the Doppler intermediate-frequency signal. For example, the trend processing for the Doppler intermediate-frequency signal may also be an envelope processing, which is based on a trend processing to the amplitude variation of the Doppler intermediate-frequency signal, based on a trend processing to the phase change of the Doppler intermediate-frequency signal, or based on a trend processing to the pulse width change of the Doppler intermediate-frequency signal, wherein the present invention shall not be limited hereby.

In particular, in the step S5, because the trend processing for the Doppler intermediate-frequency signal is to obtain the fluctuation signal corresponding to the movement of the object based on changes/variations of the movement of the object in a given time, interferences and undesired signals in the Doppler intermediate-frequency signal, such as the interferences and undesired signals corresponding to high speed movements of small substances such as grass rustling, rain, and etc. in the Doppler intermediate-frequency signal and the interferences and undesired signals produced by the test signals of the same frequency band to the anti-interference microwave detection module due to a RS test, are presented as a short and small fluctuation in the fluctuation signal when the Doppler intermediate-frequency signal is trend processed into the fluctuation signal. Therefore, it allows an implementation based on conventional signal background noise process technology to eliminate the interferences rendered by high speed movements of small substances in the detection space and the interferences brought by electromagnetic radiations similar with an RS test to the fluctuation signal. Accordingly, the anti-interference microwave detection module is able to resist the interferences rendered by fast movement of small substances and electromagnetic radiation similar to it of the RS test, including the interferences caused by electromagnetic radiation of the same frequency band with the anti-interference microwave detection module in the electromagnetic radiation of RS test or similar. It not only assures the completeness of the feedback of the fluctuation signal to the movement of the object in the detection space, but also enhances the accuracy of the feedback of the fluctuation signal to the movement of the object in the detection space, which includes the accuracy of the feedback of the fluctuation signal to the movement of the object in an outdoor detection space, such that the anti-interference microwave detection module is also suitable for detecting moving objects (e.g. vehicles and etc.) in an outdoor environment.

Further, in the step S6, depending on the frequency of an actual power supply network, the low-pass filtering processing of the fluctuation signal satisfies that the frequency of the low-pass filtering processed fluctuation signal is lower than 50 Hz or 60 Hz, wherein because electromagnetic radiation with the frequency lower than the frequency of the power supply network does not exist in the environment of the present, correspondingly, the anti-interference microwave detection module does not have electrical signal that has the same frequency to the frequency of the power supply network. Therefore, the low-pass filtering processed fluctuation signal will not be directly interfered by the circuit and the electromagnetic radiation of the present environment. Therefore, the low-pass filtering processed fluctuation signal is allowed to be amplified to the desired magnitude without affecting the accuracy of the feedback of the fluctuation signal to the movement of the object in the detection space.

In other words, the anti-interference method further comprises the following step after the step S6:

S7: amplifying the fluctuation signal.

In which, because the frequency of the low-pass filtering processed fluctuation signal in the step S6 is lower than the frequency of actual power supply network, the low-pass filtering processed fluctuation signal would not be directly interfered by the circuit and electromagnetic radiations in the environment. Hence, in the step S7, when the fluctuation signal is amplified to allow the amplified fluctuation signal be suitable for being identified and processed by corresponding circuit module, the amplification for the fluctuation signal would not affect the accuracy of the fluctuation signal, such that the identifiability and accuracy of the feedback of the fluctuation signal for the fine motions and movements, such as the fine motions and movements of a human body when breathing and heart beating and etc., are enhanced through amplifying the fluctuation signal.

It is worth mentioning that, in the step S6, since the frequency of the low-pass filtering processed fluctuation signal is lower than the frequency of actual power supply network and the frequency of human body movements is usually lower than 50 Hz, the low-pass filtering processed fluctuation signal is allowed to completely feedback the human body movements in the detection space.

In particular, since the motion frequency corresponding to the change and duration of fine motions of a human body in a normal state, such as walking, arm swinging, body/head shaking, and etc., is lower than 25 Hz, the resting respiratory rate of an adult is usually about 0.2-0.4 times/second, the heart rate of a normal adult is about 1.0-1.7 times/second, usually 1.0-1.3 times/second, and the heart rate of a normal child (under 3) is higher than 1.3 times/second, usually lower than 2.5 times/second. Accordingly, in the step S6, when the low-pass filtering processing of the fluctuation signal satisfies that the frequency of the low-pass filtering processed fluctuation signal is lower than 25 Hz, the interference to the fluctuation signal by the movement of the object other than human body movement in the detection space is reduced.

In other words, in the step S6, when the low-pass filtering processing of the fluctuation signal satisfies that the frequency of the low-pass filtering processed fluctuation signal is lower than 25 Hz, fluctuations of the fluctuation signal that are higher than 3 Hz are very likely in relative to fine motion of the human body, fluctuations of the fluctuation signal that are between 1 Hz and 3 Hz are very likely in relative to heartbeat motion of the human body, and fluctuations of the fluctuation signal that are lower than 1 Hz are very likely in relative to breathing motion of the human body. In other words, in the step S6, when the low-pass filtering processing of the fluctuation signal satisfies that the frequency of the low-pass filtering processed fluctuation signal is lower than or equal to 1 Hz, the fluctuations of the fluctuation signal are very likely with respect to breathing motions of the human body; when the low-pass filtering processing of the fluctuation signal satisfies that the frequency of the low-pass filtering processed fluctuation signal is between 1 Hz and 3 Hz, the fluctuations of the fluctuation signal are very likely with respect to heartbeat motions of the human body; and when the low-pass filtering processing of the fluctuation signal satisfies that the frequency of the low-pass filtering processed fluctuation signal is lower than 25 Hz, the fluctuations of the fluctuation signal are very likely with respect to fine motions of the human body.

It is worth mentioning that, according to the anti-interference method according to the present invention, in the step S5, it preferably utilizes at least one Butterworth low pass filter to conduct the trend processing for the Doppler intermediate-frequency signal, so as to use the integral characteristic of the Butterworth low pass filter to present the interferences rendered by high speed movements of small substances (e.g. grass rustling, rain, and etc.) in the Doppler intermediate-frequency signal as well as the interferences rendered by test signals of the same frequency band to the anti-interference microwave detection module due to RS test as a short and small fluctuation in the fluctuation signal correspondingly during trend processing the Doppler intermediate-frequency signal, so as to allow an implementation based on conventional signal background noise process technology to eliminate the interferences rendered by high speed movements of small substances in the detection space and the interferences brought by electromagnetic radiations similar to a RS test to the fluctuation signal.

In particular, the anti-interference method according to the present invention, in the step S6, further utilizes the Butterworth low pass filter to conduct the low-pass filtering processing of the fluctuation signal. Namely, it can achieve the trend processing of the Doppler intermediate-frequency signal and the low-pass filtering processing of the fluctuation signal respectively in the step S5 and the step S6 through the Butterworth low pass filter, which is simple and easy.

Those who skilled in the art would understand that, in the step S6, the anti-interference method of the present invention can also utilize a low pass filter, rather than a Butterworth low pass filter, to conduct the low-pass filtering processing to the fluctuation signal. The present invention shall not be limited thereby.

Referring to FIG. 1, the block diagram of an anti-interference microwave detection module according to a preferred embodiment of the present invention for implementing the anti-interference method is illustrated. The anti-interference method can be implemented by an anti-interference microwave detection module according to the preferred embodiment. In detail, the anti-interference microwave detection module includes an oscillating circuit 10, a frequency-mixing wave detection unit 20, an emission unit 30, a receiving unit 40, a frequency-selection unit 50, and a fluctuation signal conversion unit 60. The oscillating circuit 10 is coupled with the frequency-mixing wave detection unit 20 and the emission unit 30 and configured to be powered to produce the excitation signal, which is provided to the frequency-mixing wave detection unit 20 and the emission unit 30. The emission unit 30 emits the detecting wave beam in the detection space under the excitation of the excitation signal. The receiving unit 40 receives the echo signal produced by the echo formed from the detecting wave beam reflected by at least an object in the detection space. The frequency-selection unit 50 is coupled between the frequency-mixing wave detection unit 20 and the receiving unit 40, so as to frequency select and transmit the echo signal to the frequency-mixing wave detection unit 20. The frequency-mixing wave detection unit 20 performs a frequency-mixing wave detection with the excitation signal and the echo signal so as to generate the Doppler intermediate-frequency signal corresponding to the frequency difference of the excitation signal and the echo signal based on Doppler Effect. The fluctuation signal conversion unit 60 is electrically connected with the frequency-mixing wave detection unit 20 to receive the Doppler intermediate-frequency signal and output the fluctuation signal based on the variation tendency of the Doppler intermediate-frequency signal. The fluctuation of the fluctuation signal is corresponding to the movement of the object in the detection space.

Specifically, the receiving unit 40 includes a radiation source 41 and a reference ground 42. Examples of the receiving unit 40 to be equipped in the present invention are disclosed in U.S. Pat. No. 10,263,327 and U.S. applications, publication numbers US20190379115A1 and US20190379116A1, invented by the inventor of the present invention. According to the preferred embodiment of the present invention. The radiation source 41 and the reference ground 42 are intervally spaced and arranged in order to equivalently form a capacitor C0. The radiation source 41 has a feed point 411. The frequency-selection unit 50 includes at least one equivalent capacitor 51 and at least one equivalent inductor 52. At least one of the at least one equivalent capacitor 51 is electrically connected between the frequency-mixing wave detection unit 20 and the feed point 411 of the radiation source 41, wherein the frequency-selection unit 50 is coupled between the frequency-mixing wave detection unit 20 and the receiving unit 40. Besides, a circuit coupling structure of the frequency-selection unit 50 between the frequency-mixing wave detection unit 20 and the receiving unit 40 satisfies that the equivalent capacitor 51, the equivalent inductor 52 and the capacitor C0 forms a frequency-selection network, which is a circuit that selectively allows electrical signal within a specific frequency interval to pass through. Correspondingly, the specific frequency interval is a frequency interval including the frequency of the excitation signal. For instance, through a high impedance characteristic of the electrical signal within a portion or all of the frequency intervals that deviate from the excitation signal, the electrical signal of the specific frequency interval is selectively allowed to pass through, or that through a low impedance attenuation to ground characteristic of the electrical signal within a portion or all of the frequency intervals that deviate from the excitation signal, the electrical signal of the specific frequency interval is selectively allowed to pass through, so as to form the selection characteristic of the frequency-selection network for the electrical signal in the specific frequency interval which contains the frequency of the excitation signal. Specifically, through the circuit coupling structure of the frequency-selection unit 50 arranged between the frequency-mixing wave detection unit 20 and the receiving unit 40, the present invention forms at least one resonant circuit or at least one wave filter (including the high pass filter formed by at least one of the resonant circuits) that has a selection characteristic to the electrical signal of specific frequency interval, so as to form the frequency-selection network that selectively allows the electrical signal of specific frequency interval to pass through. Therefore, according to the selection characteristic for the electrical signal of the specific frequency interval, the echo signal is frequency selected and transmitted from the receiving unit 40 to the frequency-mixing wave detection unit 20. The present invention should not be limited to the above embodying description.

In other words, the circuit coupling structure of the frequency-selection unit 50 between the frequency-mixing wave detection unit 20 and the receiving unit 40 is able to satisfy that the frequency-selection network can be formed between the frequency-mixing wave detection unit 20 and the receiving unit 40. As mentioned above, the frequency-selection unit 50 comprises at least one equivalent capacitor 51 and at least one equivalent inductor 52. The particular coupling relationship of the equivalent capacitor 51 and the equivalent inductor 52 between the frequency-mixing wave detection unit 20 and the receiving unit 40 is not limited, as long as the frequency-selection network can be formed and defined among the equivalent capacitor 51, the equivalent inductor 52, and the capacitor C0. For instance, the frequency-selection network may be formed and defined through (i) a series type resonant circuit which is formed by the electrical connection of the at least one equivalent capacitor 51 and the at least one equivalent inductor 52 in series, (ii) a parallel type resonant circuit which is formed by the electrical connection of the at least one equivalent capacitor 51 and the at least one equivalent inductor 52 in parallel, (iii) a parallel type resonant circuit which is formed by the electrically connection of the at least one equivalent inductor 52 and the at least one capacitor C0 in parallel, (iv) a series type resonant circuit which is formed by the electrically connection of the at least one equivalent inductor 52 and the at least one capacitor C0 in series, or (v) a series-parallel type resonant circuit which is formed by the electrically connection of the least one equivalent inductor and at least one of the at least one equivalent capacitor 51 and the at least one capacitor C0 in series and parallel manner. Accordingly, in the step S3 of the anti-interference method, the echo signal is frequency-selection processed according to the frequency-selection characteristic of the frequency-selection network. The present invention should not be limited to the above embodying description.

It is worth mentioning that the equivalent capacitor 51 and the equivalent inductor 52 are components and parts having capacitor characteristics and inductance characteristics respectively under the high-frequency current corresponding to the frequency of the excitation signal. In other words, the equivalent capacitor 51 is a component having capacitor characteristics equivalently like a capacitor under the high-frequency current corresponding to the frequency of the excitation signal, such as intervally spaced micro strip lines, a high frequency capacitor, or etc. The equivalent inductor 52 is a component having inductance characteristics equivalently like an inductor under the high-frequency current corresponding to the frequency of the excitation signal, such as an inductor, micro strip lines, a resistor, and etc., i.e. a conductor having certain resistance. The present invention should not be limited to the above embodying description.

Especially, those who skilled in the art would understand that the oscillating circuit 10, the emission unit 30, and the receiving unit 40 should achieve a predetermined impedance matching relationship. As the oscillating circuit 10, the emission unit 30, and the receiving unit 40 achieve the predetermined impedance matching relationship, the frequency-selection interval of the frequency-selection network is mainly affected by the at least one equivalent capacitor 51 and the at least one equivalent inductor 52. In order to lower the accuracy requirements for the at least one equivalent capacitor 51 and the at least one equivalent inductor 52, which is to lower the accuracy requirement for the frequency-selection unit 50 in order to lower the cost of the anti-interference microwave detection module, the frequency-selection network, preferably, satisfies that the frequency of the echo signal that is frequency-selection processed by the frequency-selection network is greater than 1 Ghz and contains the frequency interval of the frequency band of the excitation signal. For example, the frequency-selection network may be a high pass filter with a feature of limiting the signals to have a frequency of 1 Ghz and lower, or a high pass filter with a feature of limiting the signals to have a frequency of 2 Ghz and lower, as long as the frequency of the echo signal which is frequency-selection processed by the frequency-selection network is greater than 1 Ghz and contains the frequency interval of the frequency band of the excitation signal. That is to say, in the step S3, the frequency-selection processing for the echo signal preferably satisfies that the frequency of the frequency-selection processed echo signal is greater than 1 GHz.

Further, the fluctuation signal conversion unit 60 is embodied as an analog filter or a digital filter that has trend processing function or a combination of a digital filter and an analog filter. The trend processing of the fluctuation signal conversion unit 60 for Doppler intermediate-frequency signal includes, but not limited to, a trend processing based on the frequency variation of the Doppler intermediate-frequency signal. For instance, the trend processing of the fluctuation signal conversion unit 60 for the Doppler intermediate-frequency signal may also be a trend processing based on the amplitude variation of the Doppler intermediate-frequency signal, a trend processing based on the phase change of the Doppler intermediate-frequency signal, and a trend processing based on the pulse width change of the Doppler intermediate-frequency signal.

Preferably, the fluctuation signal conversion unit 60 is embodied as at least one Butterworth filter, so as to utilize the integral characteristic of the Butterworth low pass filter to trend process the Doppler intermediate-frequency signal and to low-pass filtering process the fluctuation signal at the same time.

Further, the anti-interference microwave detection module also comprises at least an amplification unit 70, which is configured to be electrically connected with the fluctuation signal conversion unit 60 in order to amplify the fluctuation signal in correspondence to the step S7.

In particular, according to the preferred embodiment of the present invention, the amplification unit 70 is further arranged between the frequency-mixing wave detection unit 20 and the fluctuation signal conversion unit 60, so as to utilize the amplification unit 70 to amplify the Doppler intermediate-frequency signal. In other words, according to some embodiments of the present invention, the anti-interference method further comprises the following step between the step S4 and the step S5.

S41: amplifying the Doppler intermediate-frequency signal.

Those who skilled in the art would understand that the anti-interference method can be implemented through the anti-interference microwave detection module according to the preferred embodiment of the present invention, wherein the frequency-selection processing to the echo signal can be achieved through the frequency-selection network formed and defined by the receiving unit 40 and the frequency-selection unit 50, and the trend processing to the Doppler intermediate-frequency signal and the low-pass filtering processing to the fluctuation signal can be achieved through the fluctuation signal conversion unit 60. Also, the anti-interference microwave detection module is capable of resisting the interferences caused by the fast movement of small substances and the electromagnetic radiation interferences similar to the RS test, including the interferences caused by the electromagnetic radiation similar to the RS test that has the same frequency band of the anti-interference microwave detection module. That is the corresponding anti-interference microwave detection module has the anti-interference ability capable of obtaining the RS test certification as well as resisting the interferences caused by fast movement of small substances. It not only assures the completeness of the feedback of the fluctuation signal to the movement of the object in the detection space, but also enhances the accuracy of the feedback of the fluctuation signal to the movement of the object in the detection space.

In particular, the low-pass filtering processing of the fluctuation signal by the fluctuation signal conversion unit 60, based on the frequency of the actual power supply network, satisfies that the frequency of the low-pass filtering processed fluctuation signal is lower than 50 Hz or 60 Hz, so as to prevent the low-pass filtering processed fluctuation signal be directly interfered by the circuit and the electromagnetic radiations of current environment and to enhance the accuracy and identifiability of the feedback of the fluctuation signal to tiny motions, such as fine and micro motions of human body as the person is breathing, heart beating and etc., through amplifying the fluctuation signal with the amplification unit 70.

It is worth mentioning that when the low-pass filtering processing of the fluctuation signal conversion unit 60 to the fluctuation signal satisfies that the frequency of the low-pass filtering processed fluctuation signal is lower than 25 Hz and the completeness and accuracy of the feedback of the fluctuation signal to the movement of the human body in the detection space are also guaranteed, the interference caused by the movement of the objects other than human body in the detection space to the fluctuation signal is reduced.

Those who skilled in the art would understand that the anti-interference microwave detection module according to the above embodiment is merely an example to implement anti-interference method of the present invention, rather than a limitation to the anti-interference microwave detection module and the anti-interference method thereof of the present invention. The anti-interference microwave detection module may have several alternative modes based on the anti-interference method. For instance, according to some embodiments of the present invention, the emission unit 30 and the receiving unit 40 can be integrated. Namely, the receiving unit 40 emits the detecting wave beam to the detection space under the excitation of the excitation signal through the feed point 411 and receives the echo signal generated by the echo produced by the detecting wave beam reflected by at least one of the objects in the detection space. The present invention should not be limited by the above embodying description.

Further, the anti-interference microwave detection module also comprises a control unit 80 and an execution unit 90, wherein the control unit 80 is electrically connected between the execution unit 90 and the fluctuation signal conversion unit 60, so as for receiving the fluctuation signal and controlling the execution unit 90 according to the fluctuation signal.

Referring to FIGS. 2-14, partial equivalent circuits of the anti-interference microwave detection modules according to various embodiments of the present invention, based on the anti-interference method of the present invention, are disclosed, wherein various circuit coupling structures of the frequency-selection unit 50 configured between the receiving unit 40 and the frequency-mixing wave detection unit 20 are illustrated. In particular, according to these embodiments of the present invention, the emission unit 30 and the receiving unit 40 are integrated. More specifically, the receiving unit 40 emits the detecting wave beam in the detection space under the excitation of the excitation signal through the feed point 411 and receives the echo signal of the echo generated by the detecting wave beam reflected by at least one of the objects in the detection space. It is worth mentioning that the equivalent circuit structures of the present invention as embodied in FIGS. 2-15 can be made as a circuit board or a semiconductor circuit chip.

Figure 2:
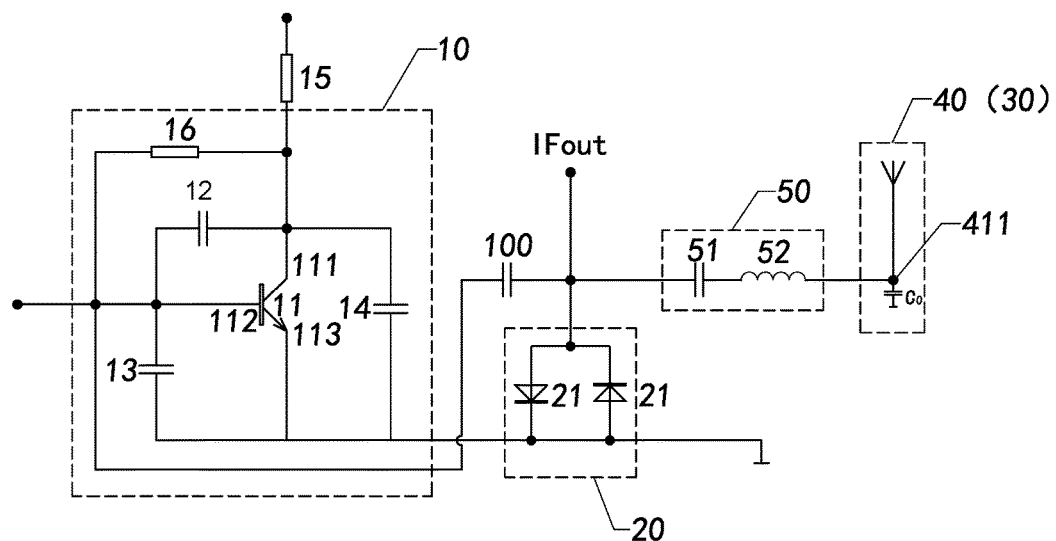
FIG. 2 is a partial circuit diagram of an equivalent circuit structure of the anti-interference microwave detection module according to the above preferred embodiment of the present invention.

Accordingly, referring to FIG. 2, a portion of the equivalent circuit structure of the anti-interference microwave detection module according to one embodiment of the present invention is disclosed. According to this embodiment of the present invention, the frequency-selection unit 50 comprises one equivalent capacitor 51 and one equivalent inductor 52, wherein one end of the equivalent capacitor 51 is electrically connected with the frequency-mixing wave detection unit 20, while the other end of the equivalent capacitor 51 is electrically connected with one end of the equivalent inductor 52, wherein the other end of the equivalent inductor 52 is electrically connected with the feed point 411 of the receiving unit 40, such that a series type resonant circuit is formed through the electrically connection of the equivalent capacitor 51 and the equivalent inductor 52 in series between the feed point 411 of the receiving unit 40 and the frequency-mixing wave detection unit 20. Then, the frequency-selection characteristic of the series type resonant circuit can be utilized for frequency-selection and transmission of the echo signal from the receiving unit 40 to the frequency-mixing wave detection unit 20.

In detail, the oscillating circuit 10 comprises a triode circuit processor 11, a first capacitor 12, a second capacitor 13, a third capacitor 14, a first resistor 15, and a second resistor 16, wherein the triode circuit processor 11 has a first connection terminal 111, a second connection terminal 112 and a grounded third connection terminal 113, wherein the first capacitor 12 is electrically connected between the first connection terminal 111 and the second connection terminal 112 of the triode circuit processor 11, wherein the second capacitor 13 is electrically connected between the second connection terminal 112 and the third connection terminal 113 of the triode circuit processor 11, wherein the second resistor 16 is electrically connected between the first connection terminal 111 and the second connection terminal 112 of the triode circuit processor 11, wherein one end of the first resistor 15 is electrically connected with the first connection terminal 111 of the triode circuit processor 11, wherein when the triode circuit processor 11 is configured to be a triode, the first connection terminal 111 is a collector of the triode, the second connection terminal 112 is a base of the triode, and the third connection terminal 113 is an emitter of the triode, wherein when the triode circuit processor 11 is configured as a MOS transistor, the first connection terminal 111 is a drain electrode of the MOS transistor, the second connection terminal 112 is a grid of the MOS transistor, and the third connection terminal 113 is a source electrode of the triode, such that when the oscillating circuit 10 is powered by the other end of the first resistor 15, the oscillating circuit 10 is allowed to provide the excitation signal from the second connection terminal 112 of the oscillating circuit 10.

Further, the frequency-mixing wave detection unit 20 includes two diodes 21 being end-to-end connected while each of the two diodes 21 has one end grounded. The frequency-mixing wave detection unit 20 is also electrically coupled with the oscillating circuit 10 through a coupling capacitor 100, wherein one end of the coupling capacitor 100 is electrically connected to the second connection terminal 112 of the triode circuit processor 11 of the oscillating circuit 10 and the other end of the coupling capacitor 100 is electrically connected between the two end-to-end connected diodes 21. The series type resonant circuit is formed and defined by the frequency-mixing wave detection unit 20 and the frequency-selection unit 50 which is electrically coupled between the two end-to-end connected diodes 21 and the feed point 411 of the receiving unit 40 so as to electrically couple the series type resonant circuit with the receiving unit 40. Accordingly, the frequency-mixing wave detection unit 20 can perform frequency-mixing wave detection of the excitation signal and frequency-selection process the echo signal through the series type resonant circuit.

It is worth mentioning that, according to the present embodiment of the present invention, the first capacitor 12, the second capacitor 13, the third capacitor 14, and the coupling capacitor 100 are components and parts that have capacitor characteristics under a high frequency current. Hence, the first capacitor 12, the second capacitor 13, the third capacitor 14, and the coupling capacitor 100 in the anti-interference microwave detection module can be embodied as intervally spaced micro strip lines, high frequency capacitor, and etc. The present invention should not be limited by the above embodying description.

Figure 3:
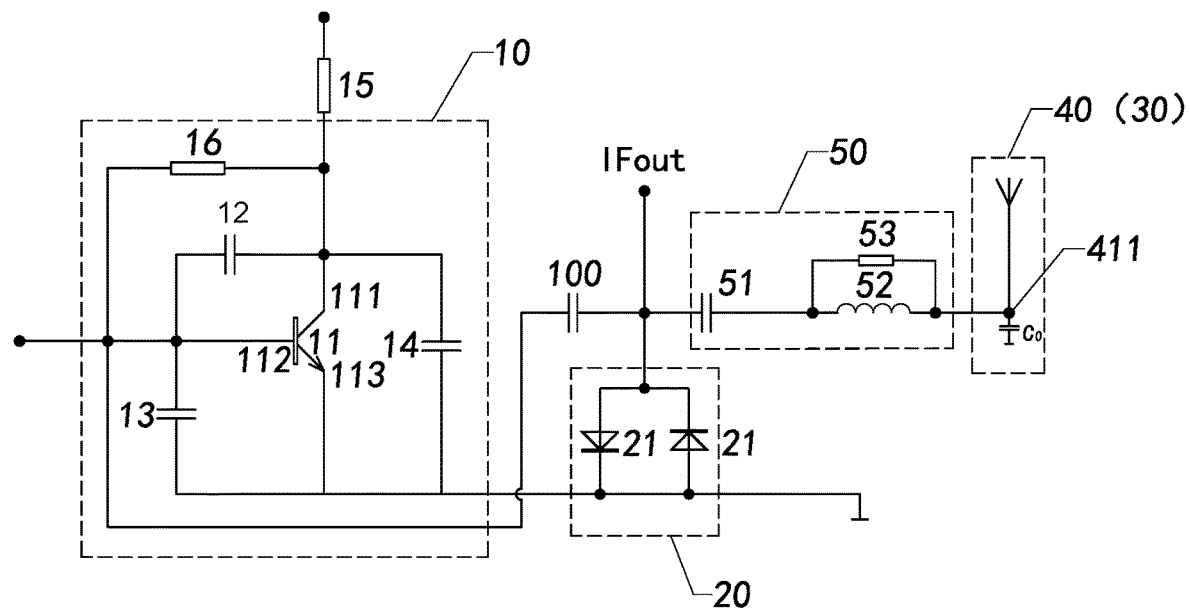
FIG. 3 is a partial circuit diagram an equivalent circuit structure of an anti-interference microwave detection module according to another preferred embodiment of the present invention.

Further, referring to FIG. 3, a portion of the equivalent circuit structure of the anti-interference microwave detection module according to another embodiment of the present invention is disclosed, which differs from the portion of the equivalent circuit structure of the anti-interference microwave detection module as illustrated in FIG. 2 in that the frequency-selection unit 50 further comprises a resistor 53 electrically connected with the equivalent inductor 52 in parallel according to this embodiment. It is appreciated that the resistor 53 has inductance characteristics under the high-frequency current corresponding to the frequency of the excitation signal. In other words, the resistor 53 is equivalent to an equivalent inductor 52 under the high-frequency current corresponding to the frequency of the excitation signal. Besides, the resistor 53 and the equivalent inductor 52 electrically connected in parallel can equivalently form an inductor so as to form the series type resonant circuit with the equivalent capacitor 51.

Figure 4:
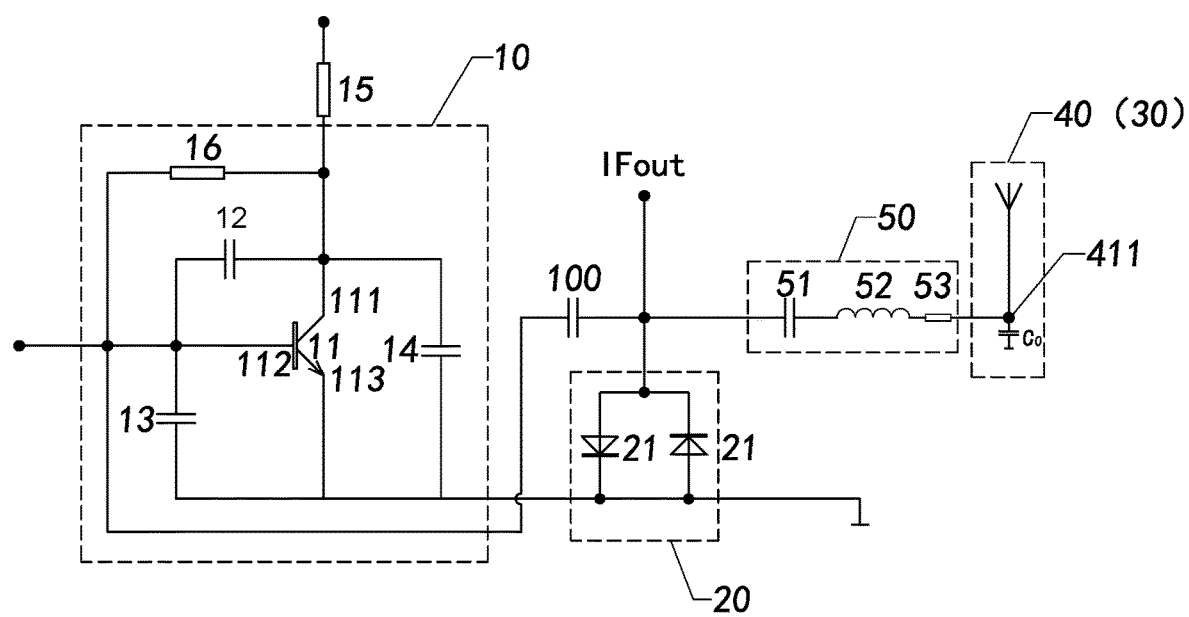
FIG. 4 is a partial circuit diagram an equivalent circuit structure of an anti-interference microwave detection module according to another preferred embodiment of the present invention.

Further, referring to FIG. 4, a portion of the equivalent circuit structure of the anti-interference microwave detection module according to another embodiment of the present invention is disclosed, which differs from the portion of the equivalent circuit structure of the anti-interference microwave detection module as illustrated in FIG. 2 in that the frequency-selection unit 50 further comprises a resistor 53 electrically connected between the equivalent inductor 52 and the feed point 411 in series, so that the equivalent capacitor 51, the equivalent inductor 52 and the resistor 53 form a series connection circuit structure, wherein since the resistor 53 has inductance characteristics under high-frequency current corresponding to the frequency of the excitation signal, the equivalent capacitor 51, the equivalent inductor 52, and the resistor 53, which are electrically connected in series with each other, form the series type resonant circuit.

It is appreciated that, according to an alternative mode of this embodiment of the present invention, the resistor 53 can also be electrically connected between the equivalent capacitor 51 and the equivalent inductor 52 in series. The present invention should not be limited in the above embodying description.

Figure 5:
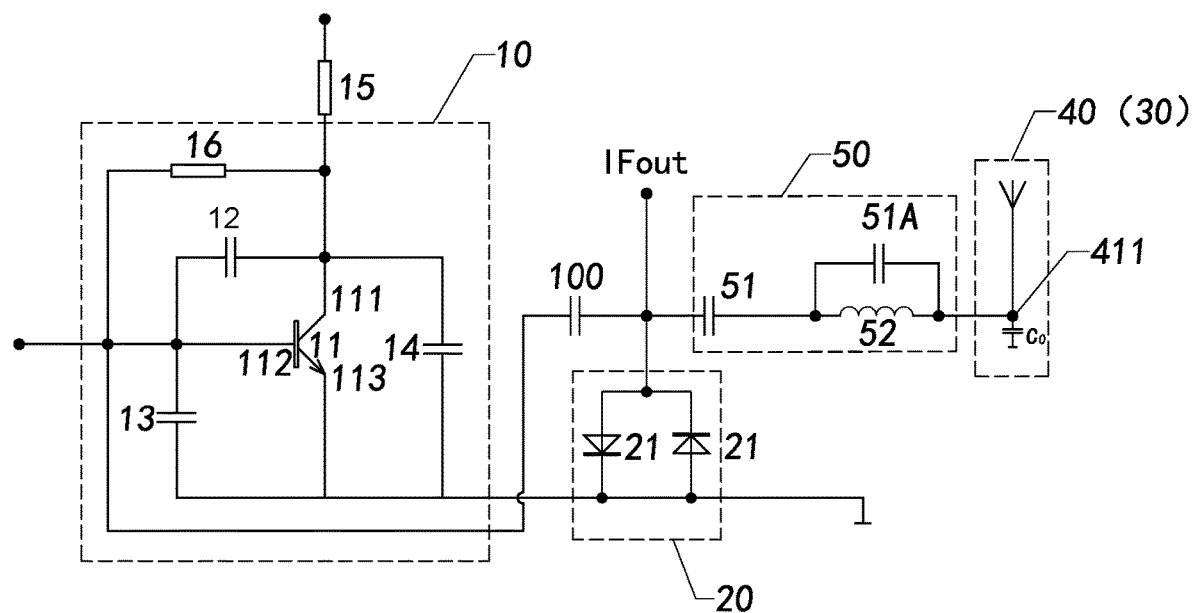
FIG. 5 is a partial circuit diagram an equivalent circuit structure of an anti-interference microwave detection module according to another preferred embodiment of the present invention.

Further, referring to FIG. 5, a portion of the equivalent circuit structure of the anti-interference microwave detection module according another embodiment of the present invention is disclosed, which differs from the portion of the equivalent circuit structure of the anti-interference microwave detection module as illustrated in FIG. 2 in that, the frequency-selection unit 50 further comprises a second equivalent capacitor 51A electrically connected with the equivalent inductor 52 in parallel. Accordingly, the equivalent inductor 52, the equivalent capacitor 51, and the second equivalent capacitor 51A can jointly form a series and parallel type resonant circuit.

Figure 6:
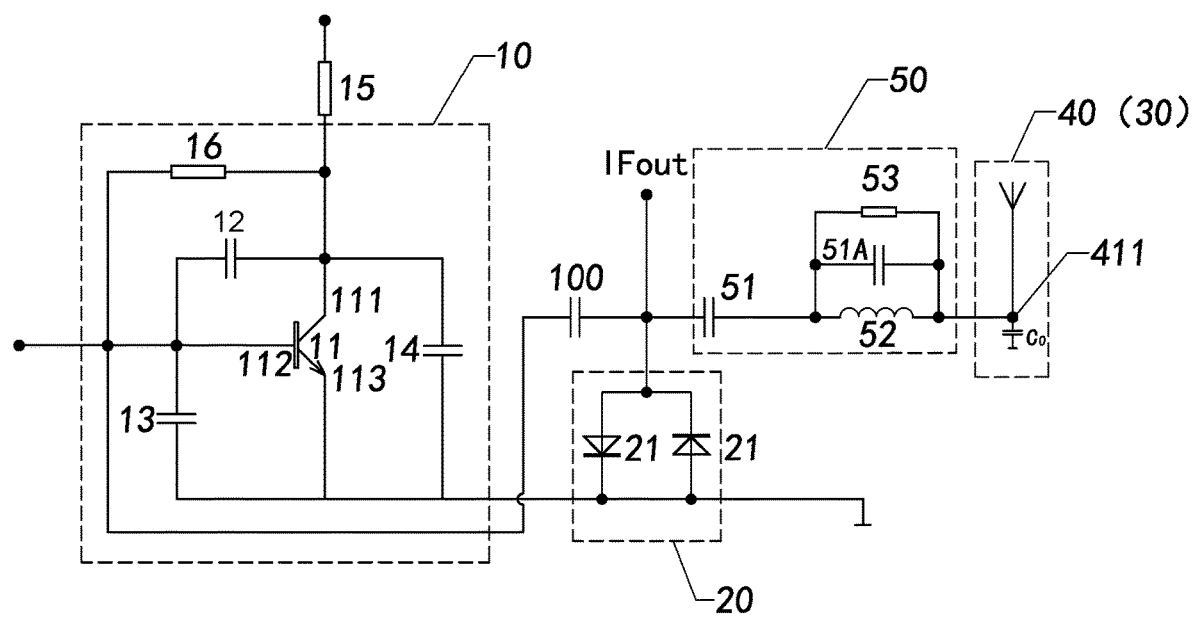
FIG. 6 is a partial circuit diagram an equivalent circuit structure of an anti-interference microwave detection module according to another preferred embodiment of the present invention.

Further, referring to FIG. 6, a portion of the equivalent circuit structure of the anti-interference microwave detection module according another embodiment of the present invention is disclosed, which differs from the portion of the equivalent circuit structure of the anti-interference microwave detection module as illustrated in FIG. 5 in that, the frequency-selection unit 50 further comprises a resistor 53 electrically connected with the equivalent capacitor 51A in parallel. Accordingly, the resistor 53, the equivalent inductor 52, the equivalent capacitor 51, and the second equivalent capacitor 51A are also jointly form a series and parallel type resonant circuit.

Figure 7:
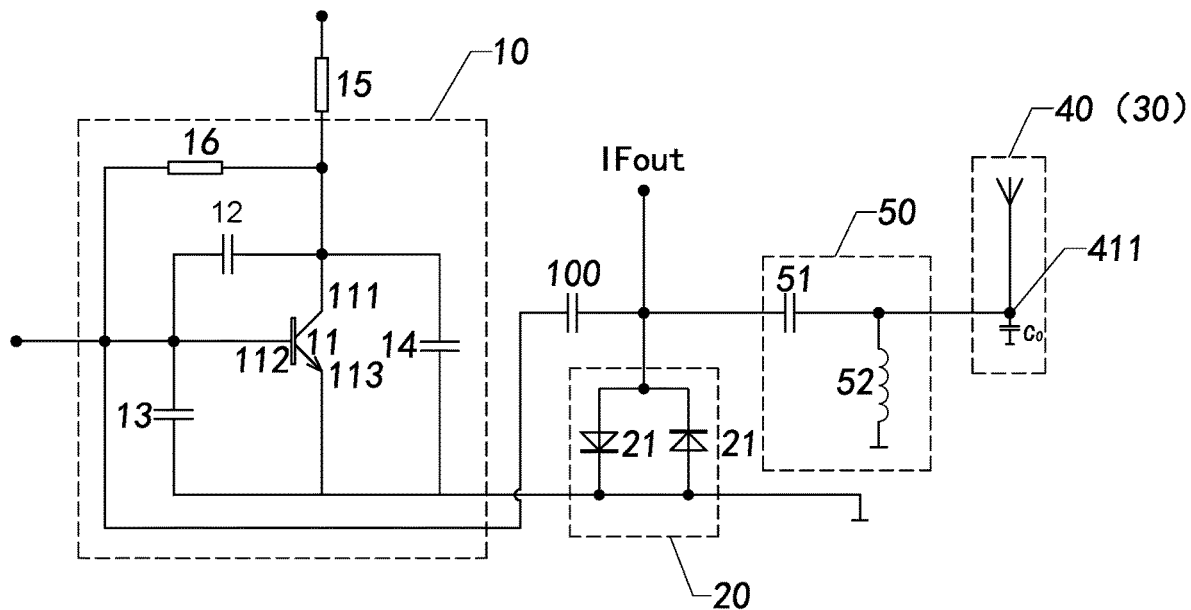
FIG. 7 is a partial circuit diagram an equivalent circuit structure of an anti-interference microwave detection module according to another preferred embodiment of the present invention.

Further, referring to FIG. 7, a portion of the equivalent circuit structure of the anti-interference microwave detection module according to another embodiment of the present invention is disclosed. According to this embodiment of the present invention, the frequency-selection unit 50 comprises the at least one equivalent capacitor 51 and the at least one equivalent inductor 52, wherein one end of the equivalent capacitor 51 is electrically connected with the frequency-mixing wave detection unit 20, while the other end of the equivalent capacitor 51 is electrically connected with the feed point 411 of the receiving unit 40, wherein one end of the equivalent inductor 52 is electrically connected with the feed point 411 of the receiving unit 40 while the other end of the equivalent inductor 52 is grounded, so that the equivalent inductor 52 is equivalently connected with the capacitor C0 of the receiving unit 40 in parallel. In other words, the equivalent inductor 52 and the capacitor C0 form a parallel type resonant circuit, wherein the frequency-mixing wave detection unit 20 is electrically coupled with the parallel type resonant circuit through the equivalent capacitor 51, such that the echo signal can be frequency selected by the parallel type resonant circuit and transmitted to the frequency-mixing wave detection unit 20 through the coupled equivalent capacitor 51.

Figure 8:
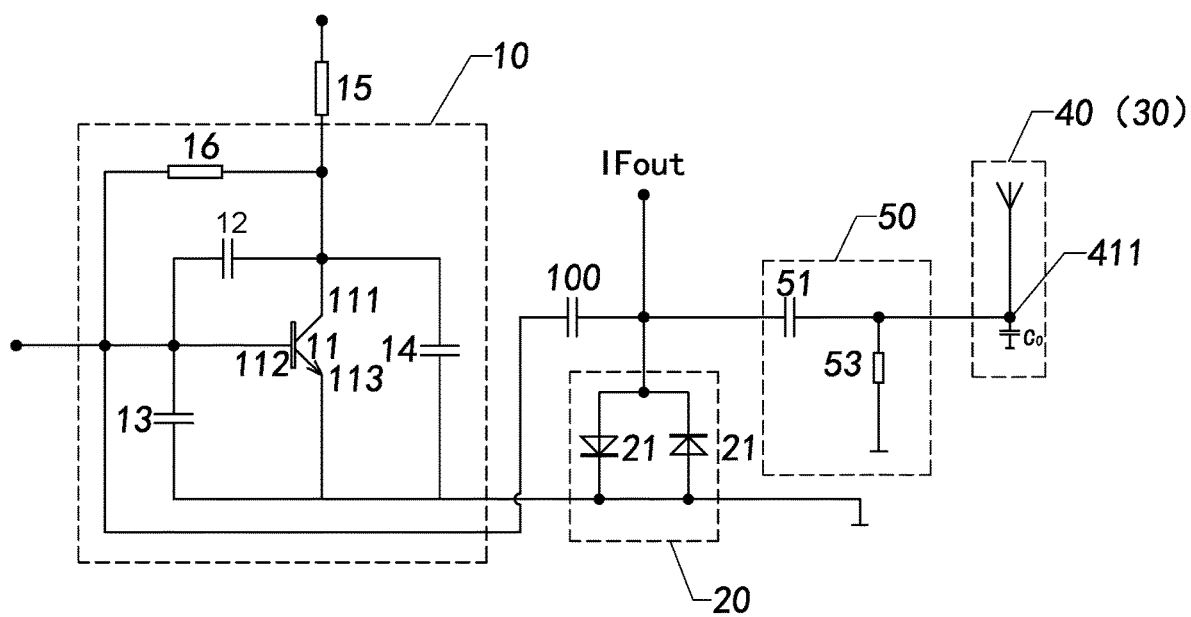
FIG. 8 is a partial circuit diagram an equivalent circuit structure of an anti-interference microwave detection module according to another preferred embodiment of the present invention.

Further, referring to FIG. 8, a portion of the equivalent circuit structure of the anti-interference microwave detection module according another embodiment of the present invention is disclosed, which differs from the equivalent circuit structure of the anti-interference microwave detection module as illustrated in FIG. 7 in that, the equivalent inductor 52 is embodied as a resistor 53, which performs inductance characteristics under the high-frequency current corresponding to the frequency of the excitation signal, that equivalently forms the equivalent inductor 52.

Figure 9:
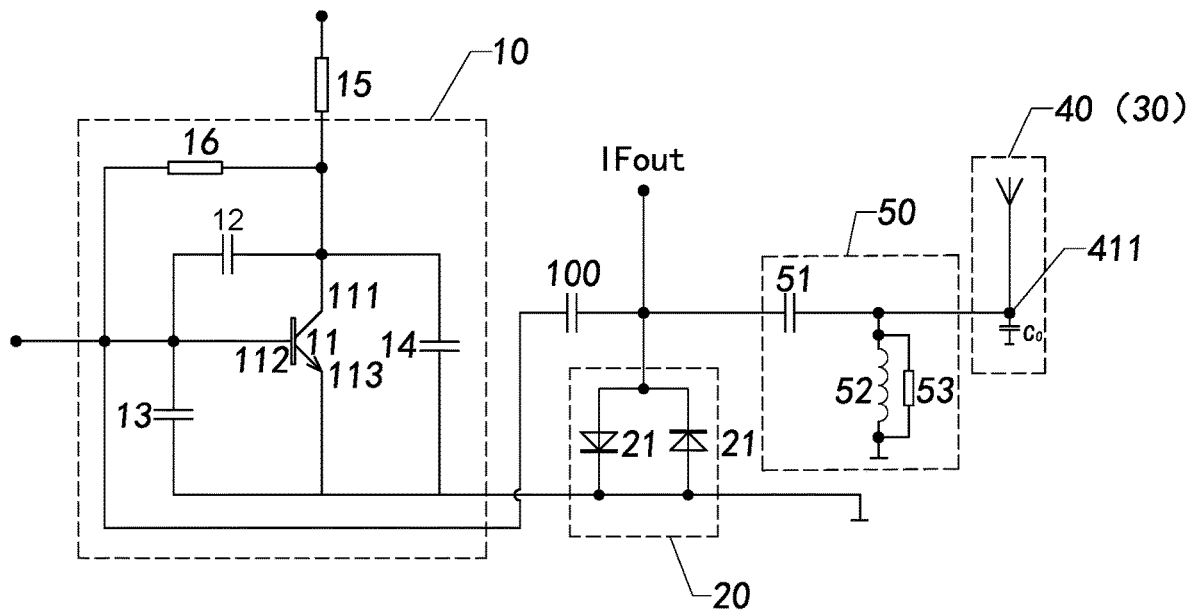
FIG. 9 is a partial circuit diagram an equivalent circuit structure of an anti-interference microwave detection module according to another preferred embodiment of the present invention.

Further, referring to FIG. 9, a portion of the equivalent circuit structure of the anti-interference microwave detection module according to another embodiment of the present invention is disclosed, which differs from the equivalent circuit structure of the anti-interference microwave detection module as illustrated in FIG. 7 in that, the frequency-selection unit 50 further comprises a resistor 53 electrically connected with the equivalent inductor 52 in parallel. It is appreciated that the resistor 53 has inductance characteristics under the high-frequency current corresponding to the frequency of the excitation signal. In other words, the resistor 53 is equivalent to an equivalent inductor 52 under the high-frequency current corresponding to the frequency of the excitation signal. Besides, the resistor 53 and the equivalent inductor 52 which are electrically connected in parallel can equivalently form an inductor and form a parallel type resonant circuit with the capacitor C0.

Figure 10:
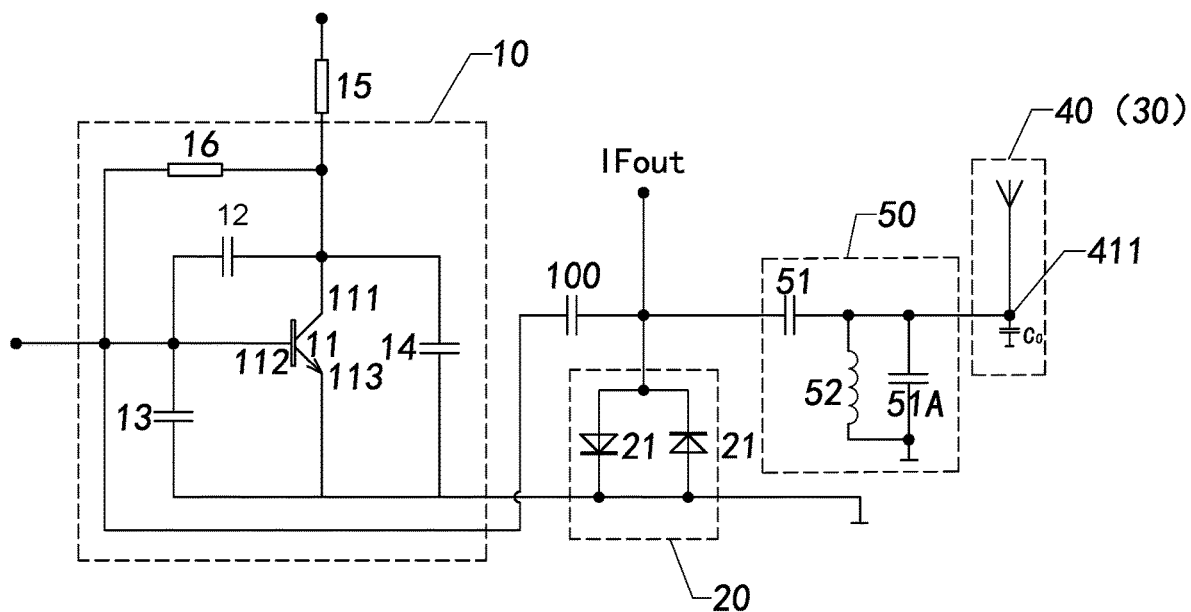
FIG. 10 is a partial circuit diagram an equivalent circuit structure of an anti-interference microwave detection module according to another preferred embodiment of the present invention.

Further, referring to FIG. 10, a portion of the equivalent circuit structure of the anti-interference microwave detection module according another embodiment of the present invention is disclosed, which differs from the equivalent circuit structure of the anti-interference microwave detection module as illustrated in FIG. 7 in that, the frequency-selection unit 50 further comprises the second equivalent capacitor 51A which is electrically connected with the equivalent inductor 52 in parallel. Accordingly, the equivalent inductor 52, the second equivalent capacitor 51A and the capacitor C0 which are substantially electrically connected in parallel can jointly form a parallel type resonant circuit.

Figure 11:
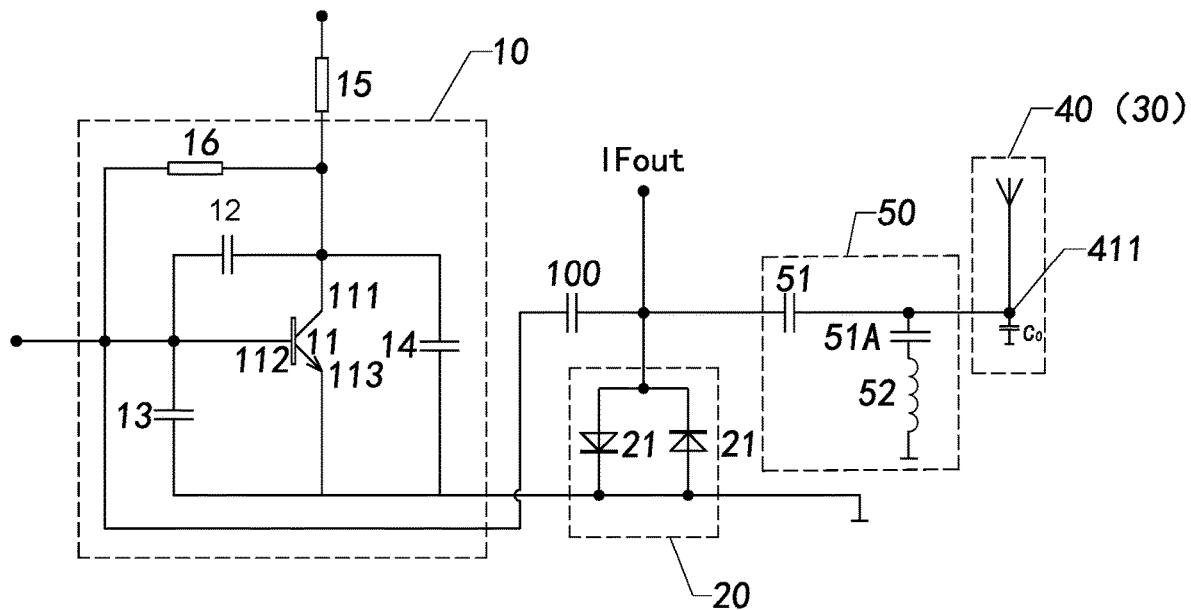
FIG. 11 is a partial circuit diagram an equivalent circuit structure of an anti-interference microwave detection module according to another preferred embodiment of the present invention.

Further, referring to FIG. 11, a portion of the equivalent circuit structure of the anti-interference microwave detection module according another embodiment of the present invention is disclosed, which differs from the equivalent circuit structure of the anti-interference microwave detection module as illustrated in FIG. 7 in that, the frequency-selection unit 50 further comprises the second equivalent capacitor 51A which is electrically connected between the equivalent inductor 52 and the feed point 411 of the receiving unit 40. Accordingly, the second equivalent capacitor 51A and the equivalent inductor 52 are electrically connected in series to form a series type resonant circuit which is electrically connected in parallel with the capacitor C0 to form a series and parallel type resonant circuit.

Figure 12:
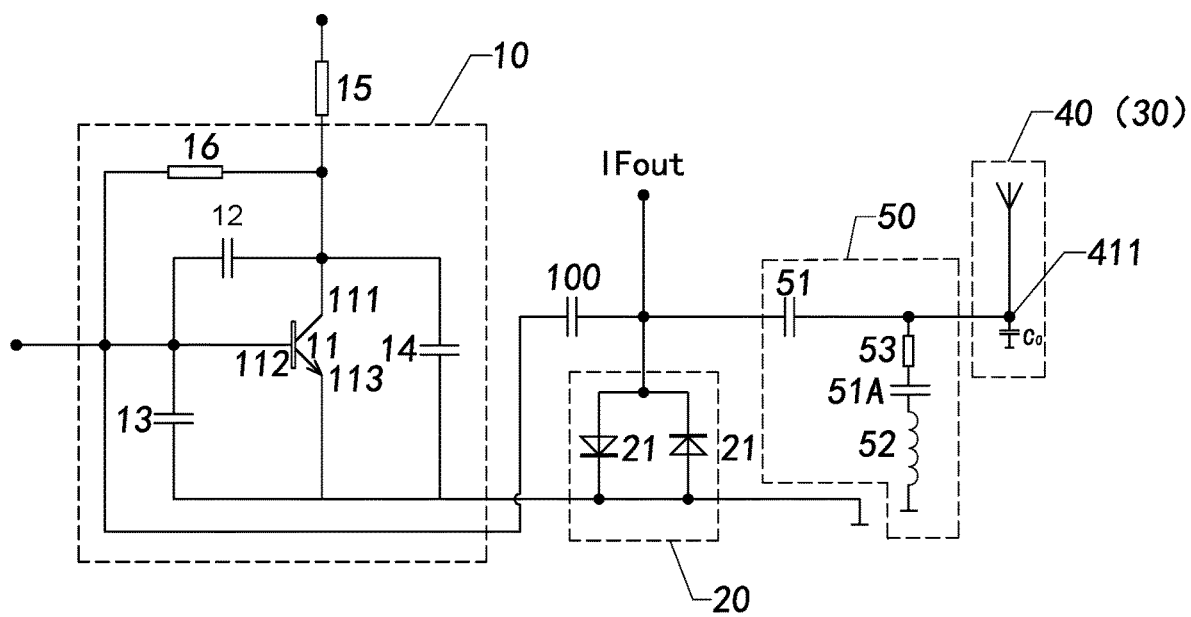
FIG. 12 is a partial circuit diagram an equivalent circuit structure of an anti-interference microwave detection module according to another preferred embodiment of the present invention.

Further, referring to FIG. 12, a portion of the equivalent circuit structure of the anti-interference microwave detection module according another embodiment of the present invention is disclosed, which differs from the equivalent circuit structure of the anti-interference microwave detection module as illustrated in FIG. 11 in that, the frequency-selection unit 50 further comprises the resistor 53 which is electrically connected between the second equivalent capacitor 51A and the feed point 411 of the receiving unit 40. Accordingly, the resistor 53, the second equivalent inductor 51A and the equivalent inductor 52 can be sequentially connected in series to form a series type resonant circuit which is then electrically connected in parallel with the capacitor C0 to form a series and parallel type resonant circuit.

Figure 13:
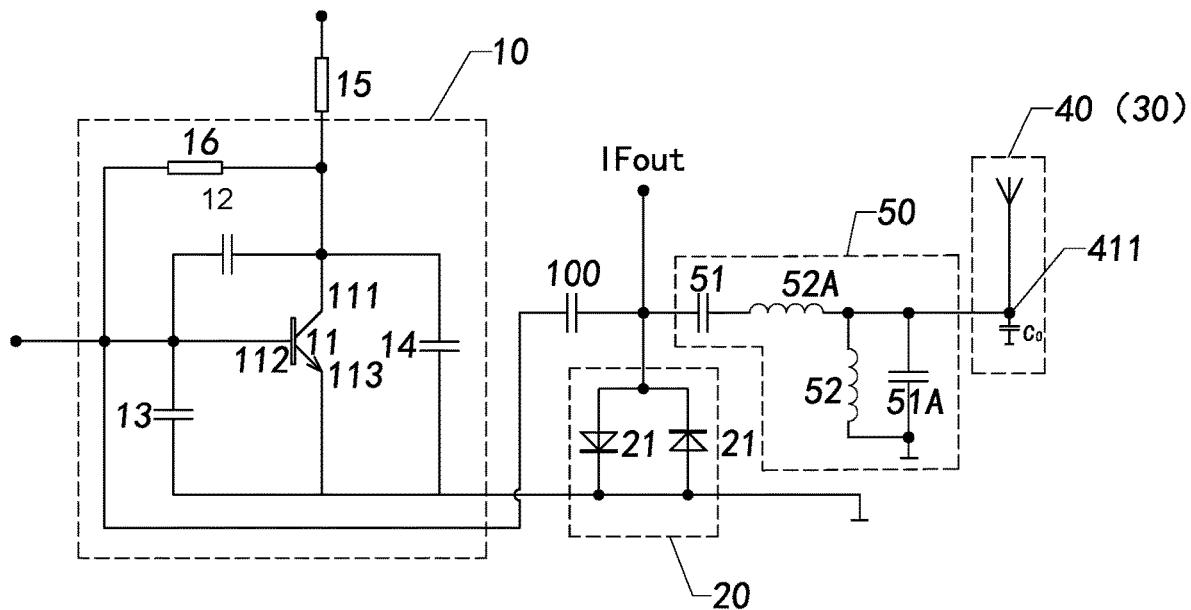
FIG. 13 is a partial circuit diagram an equivalent circuit structure of an anti-interference microwave detection module according to another preferred embodiment of the present invention.

Further, referring to FIG. 13, a portion of the equivalent circuit structure of the anti-interference microwave detection module according another embodiment of the present invention is disclosed, which differs from the equivalent circuit structure of the anti-interference microwave detection module as illustrated in FIG. 10 in that, the frequency-selection unit 50 further comprises a second equivalent inductor 52A, which is electrically connected between the equivalent capacitor 51 and the feed point 411 of the receiving unit 40. Specifically, one end of the second equivalent inductor 52A is electrically connected with the equivalent capacitor 51, while the other end of the second equivalent inductor 52A is electrically connected with the feed point 411 and the equivalent inductor 52. In other words, the equivalent inductor 52A is electrically connected between the equivalent capacitor 51 and the feed point 411 and electrically connected with the equivalent capacitor 51 in series. Accordingly, the second equivalent inductor 52A and the equivalent capacitor 51 are electrically connected in series between the frequency-mixing wave detection unit 20 and the feed point 411 of the receiving unit 40 to form a series type resonant circuit, while the equivalent inductor 52, the equivalent capacitor 51A, and the capacitor C0 are electrically connected in parallel to form a parallel type resonant circuit.

Figure 14:
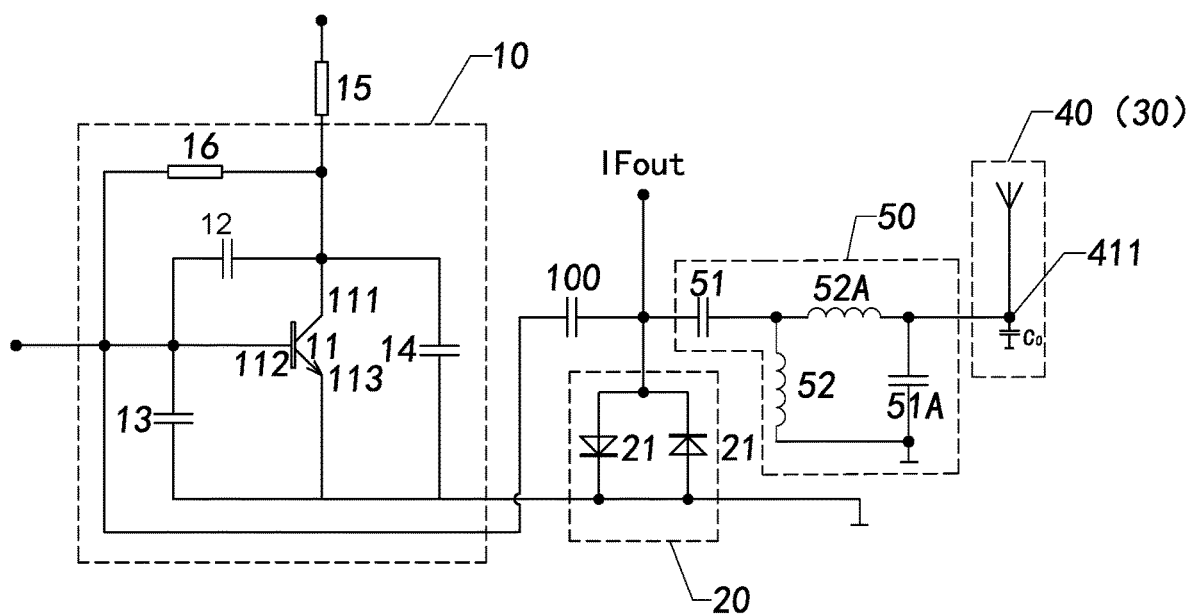
FIG. 14 is a partial circuit diagram an equivalent circuit structure of an anti-interference microwave detection module according to another preferred embodiment of the present invention.

Further, referring to FIG. 14, a portion of the equivalent circuit structure of the anti-interference microwave detection module according another embodiment of the present invention is disclosed, which differs from the equivalent circuit structure of the anti-interference microwave detection module as illustrated in FIG. 13 in that, one end of the equivalent capacitor 52 is electrically connected between the equivalent capacitor 51 and the second equivalent inductor 52A, while the other end of the equivalent capacitor 52 is grounded. In other words, the second equivalent inductor 52A is electrically connected between the equivalent inductor 52 and the feed point 411 and electrically connected with the equivalent capacitor 51 in series. Accordingly, the second equivalent inductor 52A and the equivalent capacitor 51 are electrically connected in series between the frequency-mixing wave detection unit 20 and the feed point 411 of the receiving unit 40 to form a series type resonant circuit, while the equivalent inductor 52 and the second equivalent inductor 52A are electrically connected in series to equivalently form an inductor that is electrically connected with the second equivalent capacitor 51A and the capacitor C0 in parallel to form a parallel type resonant circuit.

Figure 15:
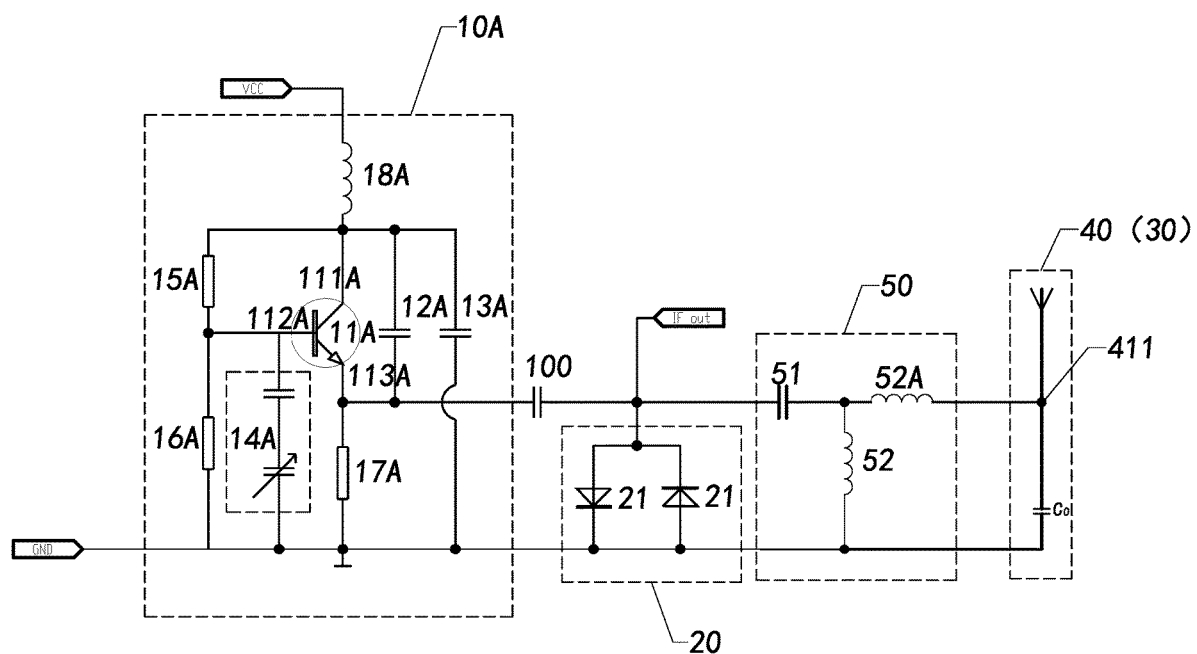
FIG. 15 is a partial circuit diagram an equivalent circuit structure of an anti-interference microwave detection module according to another preferred embodiment of the present invention.

Further, referring to FIG. 15, a portion of the equivalent circuit structure of the anti-interference microwave detection module according another embodiment of the present invention is disclosed, which differs from the equivalent circuit structure of the anti-interference microwave detection module as illustrated in FIG. 14 in that, the second equivalent capacitor 51A of the anti-interference microwave detection module as illustrated in FIG. 14 is absent in this embodiment of the present invention. Accordingly, the second equivalent inductor 52A and the equivalent capacitor 51 are electrically connected in series between the frequency-mixing wave detection unit 20 and the feed point 411 of the receiving unit 40 to form a series type resonant circuit. At the same time, the equivalent inductor 52 and the second equivalent inductor 52A are electrically connected in series to equivalently form an inductor that is electrically connected with the capacitor C0 in parallel to form a parallel type resonant circuit.

In other words, since the receiving unit 40 can equivalently form the capacitor C0, the second equivalent capacitor 51A electrically connected with the capacitor C0 in series or in parallel can also equivalently form a capacitor. Therefore, according to the partial equivalent circuit structures of the anti-interference microwave detection modules as illustrated in FIGS. 10-14, the second equivalent capacitor 51A electrically connected with the capacitor C0 in series or in parallel may be omitted, so as to form alternative equivalent modes with respect to the above embodiments of the anti-interference microwave detection module of the present invention. For example, when the second equivalent capacitor 51A of the anti-interference microwave detection module as illustrated in FIG. 10 is omitted, it will equivalently form the anti-interference microwave detection module as illustrated in FIG. 10 that is corresponding to the anti-interference microwave detection module as illustrated in FIG. 7. In other words, the anti-interference microwave detection module as embodied and illustrated in FIG. 10 and the anti-interference microwave detection module as embodied and illustrated in FIG. 7 are equivalent with each other. Other similar equivalent alternative modes and conditions of the above embodiments are apparent to one skilled in this art based on the disclosure of the present invention and thus are not specified in detail here.

Similarly, the equivalent inductor 52 and the second equivalent inductor 52A which are electrically in series or in parallel and the resistor 53 which has inductance characteristics under high-frequency current corresponding to the frequency of the excitation signal can equivalently form an inductor. Hence, there are still many apparent equivalent alternatives and modifications for the equivalent circuit structures of the anti-interference microwave detection modules as illustrated in FIGS. 2-15. Therefore, the present invention should not be limited to the above embodying description.

Further, according to the portion of the equivalent circuit structure of the anti-interference microwave detection module as illustrated in FIG. 15, which is different from the equivalent circuit structures of the anti-interference microwave detection modules as illustrated in FIGS. 2-14, the oscillating circuit 10A comprises a triode circuit processor 11A, a first capacitor 12A, a second capacitor 13A, a third capacitor 14A, a first resistor 15A, a second resistor 16A, a third resistor 17A, and a inductor 18A, wherein the triode circuit processor 11A has a first connection terminal 111A, a second connection terminal 112A, and a grounded third connection terminal 113A, wherein the first capacitor 12A is electrically connected between the first connection terminal 111A and the third connection terminal 113A of the triode circuit processor 11A, wherein one end of the second capacitor 13A is electrically connected to the first connection terminal 111A of the triode circuit processor 11A while the other end of the second capacitor 13A is grounded, wherein one end of the third capacitor 14A is electrically connected with the second connection terminal 112A of the triode circuit processor 11A while the other end of the third capacitor 14A is grounded, wherein the first resistor 15A is electrically connected between the first connection terminal 111A and the second connection terminal 112A of the triode circuit processor 11A, wherein one end of the second resistor 16A is electrically connected with the second connection terminal 112A of the triode circuit processor 11A while the other end of the second resistor 16A is grounded, wherein one end of the third resistor 17 is electrically connected with the third connection terminal 113A of the triode circuit processor 11A while the other end of the third resistor 17A is grounded, wherein one end of the inductor 18A is electrically connected with the first connection terminal 111A of the triode circuit processor 11A, wherein when the triode circuit processor 11A is embodied as a triode, the first connection terminal 111A is a collector of the triode, the second connection terminal 112A is a base of the triode, and the third connection terminal 113A is an emitter of the triode, wherein when the triode circuit processor 11A is embodied as a MOS transistor, the first connection terminal 111A is a drain electrode of the MOS transistor, the second connection terminal 112A is a grid of the MOS transistor, and the third connection terminal 113A is a source electrode of the MOS transistor, such that when the oscillating circuit 10A is powered by the other end of the inductor 18A, the oscillating circuit 10A is allowed to provide the excitation signal from the third connection terminal 113A of the triode circuit processor 11A. In other words, the frequency-mixing wave detection unit 20 is electrically coupled to the third connection terminal 113A of the triode circuit processor 11A of the oscillating circuit 10A through the coupling capacitor 100 which one end is electrically connected to the connection terminal 113A of the triode circuit processor 11A of the oscillating circuit and the other end is electrically connected between the two end-to-end connected diodes 21.

It is worth mentioning that, according to the portion of the equivalent circuit structure of the anti-interference microwave detection module as illustrated in FIG. 15, the oscillating circuit 10A provides the excitation signal at the third connection terminal 113A of the triode circuit processor 11A, wherein since the third connection terminal 113A is the collecting electrode which is the end of the triode circuit processor 11A that collects the currents, the excitation signal can be enhanced that lowers the impedance of the oscillating circuit 10A and facilitates the matching between the oscillating circuit 10A and the receiving unit 40 with low impedance. For instance, when the resonant circuit formed and defined between the frequency-mixing wave detection unit 20 and the receiving unit 40 is grounded in the configuration of the frequency-selection unit 50, a low impedance between the receiving unit and the ground is formed.

In particular, when the frequency-selection unit 50 is embodied to then have the resonant circuit formed and defined between the frequency-mixing wave detection unit 20 and the grounded receiving unit 40, the quality factor of the resonant circuit will be enhanced, which then reduces the range of frequency-selection for the resonant circuit to the electromagnetic radiations corresponding to the frequency of the anti-interference microwave detection module in the environment and helps to reduce the interference from the electromagnetic radiations of different frequency bands than the anti-interference microwave detection module to the echo signal.

One skilled in the art will understand that the embodiment of the present invention as shown in the drawings and described above is exemplary only and not intended to be limiting. It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An anti-interference method of an anti-interference microwave detection module for reducing interferences of one or more electromagnetic radiations of frequency bands that are 1 GHz and below and different from an excitation signal in a detection space with respect to an echo signal, comprising steps of:
   (S1) emitting and transmitting at least one detecting wave beam in the detection space under an excitation of the excitation signal;
   (S2) receiving an echo of wave signals of various frequency bands in the detection space, including a signal formed by a reflection of the at least one detecting wave beam by at least one human body in the detection space and one or more wave signals interfered by an electromagnetic environment in the detection space and generating the echo signal by a receiving unit, comprising a reference ground and a radiation source having a feed point, of the anti-interference microwave detection module;
   (S3) frequency-selection processing the echo signal by selecting a specific frequency interval from frequency intervals of the echo signal containing a frequency band of the excitation signal through filtering the echo signal by a frequency-selection unit to eliminate the frequency intervals that are different from the frequency band of the excitation signal in the echo signal so as to reduce the interferences of the electromagnetic radiations of different frequency bands that are 1 GHz and below and different from the excitation signal in the detection space with respect to the echo signal, wherein the frequency-selection unit comprises at least one equivalent capacitor and at least one equivalent inductor, wherein one end of the equivalent capacitor is electrically connected with the frequency-mixing wave detection unit, while the other end of the equivalent capacitor is electrically connected with the feed point of the receiving unit, wherein one end of the equivalent inductor is electrically connected with the feed point of the receiving unit while the other end of the equivalent inductor is grounded; and
   (S4) while a frequency of the echo is equal to a frequency of the at least one detecting wave beam during the at least one human body is not moving with respect to the anti-interference microwave detection module detecting the excitation signal and the echo signal by a frequency-mixing wave detection unit to generate a Doppler intermediate-frequency signal corresponding to a frequency difference of the excitation signal and the echo signal according to Doppler effect, wherein the Doppler intermediate-frequency signal is responsive to a movement of the at least one human body in the detection space, wherein the frequency-selection unit is coupled between the frequency-mixing wave detection unit and the receiving unit for forming and defining a frequency-selection network between the frequency-mixing wave detection unit and the receiving unit, wherein the frequency-selection network comprises at least a wave filter forming at least one resonant circuit configured for forming the frequency-selection network through a selection of the electrical signals in the specific frequency interval by the resonant circuit, wherein the resonant circuit is formed and defined between the frequency-mixing wave detection unit and the receiving unit to reduces reduce a range of frequency-selection for the resonant circuit to the electromagnetic radiations corresponding to the frequency of the anti-interference microwave detection module in the detection space so as to facilitate reducing the interferences from the electromagnetic radiations of different frequency bands than the anti-interference microwave detection module to the echo signal.

2. The anti-interference method, as recited in claim 1, wherein, in the step (S3), the echo signal is frequency-selected by the frequency-selection network which selectively allows electrical signals of the specific frequency interval containing the frequency band of the excitation signal to pass through by processing a wave filtering at least a portion of the frequency intervals of the echo signal by eliminating the frequency intervals of the echo signal which are different from the frequency band of the excitation signal.

3. The anti-interference method, as recited in claim 2, wherein in the step (S3), the resonant circuit is grounded.

4. The anti-interference method, as recited in claim 2, wherein in the step (S3), the frequency-selection processing the echo signal satisfies that a frequency of the frequency-selection processing the echo signal is larger than 1 GHz.

5. The anti-interference method, as recited in claim 4, further comprising steps of:
   (S5) trend processing the Doppler intermediate-frequency signal in order to obtain a fluctuation signal corresponding to the movement of the at least one human body based on a trend variation of the Doppler intermediate-frequency signal caused by of the movement of the at least one human body in a given time through a frequency formula $f=f_0 \cdot v/c$, wherein the f is the frequency of the Doppler intermediate-frequency signal corresponding to the movement of the at least one human body, the $f_0$ is the frequency of the excitation signal, the v is a velocity component of a moving speed of the at least one human body in the detection space with respect to the anti-interference microwave detection module towards the anti-interference microwave detection module, and the c is a transmission speed of the electromagnetic radiation in the detection space, such that a characteristic parameter of the fluctuation signal is corresponding to one or more characteristics of the movement of the at least one human body in the detection space, wherein when a value of v of the movement of the at least one human body is positive, that is a velocity of the at least one human body moving away from the anti-interference microwave detection module is positive, a frequency value of f of the Doppler intermediate frequency signal is positive, wherein when the value of v of the at least one human body is zero, the frequency value of f of the Doppler intermediate frequency signal is zero, wherein when the value of the at least one human body is negative, that is the velocity of the at least one human body moving toward the anti-interference microwave detection module is negative, the frequency value off of the Doppler intermediate frequency is negative; and
   (S6) low-pass filtering the fluctuation signal to form a low-pass processed fluctuation signal that satisfies a frequency of the low-pass filtering processed fluctuation signal is lower than 50 Hz, such that the low-pass filtering processed fluctuation signal is allowed to be amplified to a desired magnitude without affecting an accuracy of the movement of the at least one human body in the detection space.

6. The anti-interference method, as recited in claim 5, wherein in the step (S6), the low-pass filtering processed fluctuation signal satisfies that the frequency of the low-pass filtering processed fluctuation signal is lower than a frequency of an actual power supply network.

7. The anti-interference method, as recited in claim 6, wherein in the step (S6), the low-pass filtering processed fluctuation signal satisfies that the frequency of the low-pass filtering processed fluctuation signal is lower than 25 Hz.

8. The anti-interference method, as recited in claim 7, before the step (S5), further comprising a step of amplifying the Doppler intermediate-frequency signal.

9. The anti-interference method, as recited in claim 8, wherein the wave filter of the resonant circuit is a high-pass filter and, in the step (S6), the fluctuation signal is low-pass filtered by at least a low pass filter.

10. The anti-interference method, as recited in claim 8, wherein the step (S5) further comprises a step of envelope processing of the Doppler intermediate-frequency signal to perform the trend processing to an amplitude variation of the Doppler intermediate-frequency signal.

11. The anti-interference method, as recited in claim 10, wherein in the step (S5) and step (S6), the Doppler intermediate-frequency signal is trend processed and the fluctuation signal is low-pass filtered by at least a Butterworth low pass filter at the same time.

12. The anti-interference method, as recited in claim 11, after the step (S6), further comprising a step of amplifying the fluctuation signal.

13. An anti-interference microwave detection module for reducing interferences of one or more electromagnetic radiations of frequency bands that are 1 GHz and below and different from an excitation signal in a detection space with respect to an echo signal, comprising:
an oscillating circuit, configured to be powered to produce the excitation signal;
an emission unit, coupled to the oscillating circuit, emitting a detecting wave beam in a detection space under an excitation of the excitation signal;
a receiving unit, which comprises a reference ground and a radiation source which has a feed point, receiving an echo signal produced by an echo formed from the detecting wave beam reflected by at least one human body in the detection space;
a frequency-mixing wave detection unit, which is coupled to said oscillating circuit and said receiving unit, arranged to perform a frequency mixing wave detection with the excitation signal and the echo signal so as to generate a Doppler intermediate-frequency signal corresponding to a frequency difference of the excitation signal and the echo signal based on Doppler effect so as to enhance movement information in the echo signal, wherein the Doppler intermediate-frequency signal is responsive to the movement of the at least one human body in the detection space; and
a frequency-selection unit, coupled between the frequency-mixing wave detection unit and the receiving unit to form and define a frequency-selection network between the frequency-mixing wave detection unit and the receiving unit, wherein the frequency-selection unit comprises at least one equivalent capacitor and at least one equivalent inductor, wherein one end of the equivalent capacitor is electrically connected with the frequency-mixing wave detection unit, while the other end of the equivalent capacitor is electrically connected with the feed point of the receiving unit, wherein one end of the equivalent inductor is electrically connected with the feed point of the receiving unit while the other end of the equivalent inductor is grounded, wherein the echo signal is processed by selecting a specific frequency interval by the frequency-selection network from frequency intervals of the echo signal containing a frequency band of the excitation signal through filtering the echo signal to eliminate the frequency intervals that are different from the frequency band of the excitation signal in the echo signal, and transmitted to the frequency-mixing wave detection unit through the frequency-selection unit, so as to reduce an interference of electromagnetic radiations of different frequency bands from the excitation signal in the detection space to the Doppler intermediate-frequency signal.

14. The anti-interference microwave detection module, as recited in claim 13, wherein the radiation source and the reference ground are spacingly arranged to equivalently form a capacitor C0, wherein the frequency-selection unit comprises at least one equivalent capacitor and at least one equivalent inductor, wherein the equivalent capacitor is electrically connected between the frequency-mixing wave detection unit and the feed point of the radiating source, wherein the equivalent capacitor, the equivalent inductor, and the capacitor C0 form a frequency-selection network.

15. The anti-interference microwave detection module, as recited in claim 14, wherein the frequency-selection network satisfies that a frequency band of the echo signal processed by the frequency-selection network is greater than 1 Ghz.

16. The anti-interference microwave detection module, as recited in claim 15, wherein one end of the equivalent capacitor is electrically connected with the frequency-mixing wave detection unit and the other end of the equivalent capacitor is electrically connected with one end of the equivalent inductor, wherein the other end of the equivalent inductor is electrically connected with the feed point of the receiving unit.

17. The anti-interference microwave detection module, as recited in claim 16, wherein the frequency-selection unit further comprises a resistor electrically connected with the equivalent inductor in parallel.

18. The anti-interference microwave detection module, as recited in claim 16, wherein the frequency-selection unit further comprises a resistor, which is electrically connected between the equivalent inductor and the feed point, being electrically connected with the equivalent inductor and the equivalent capacitor in series.

19. The anti-interference microwave detection module, as recited in claim 16, wherein the frequency-selection unit comprises a second equivalent capacitor electrically connected with the equivalent inductor in parallel.

20. The anti-interference microwave detection module, as recited in claim 19, wherein the frequency-selection unit further comprises a resistor electrically connected with the equivalent inductor in parallel.

21. The anti-interference microwave detection module, as recited in claim 16, wherein the frequency-selection unit comprises a second equivalent inductor which one end is electrically connected between the equivalent capacitor and the equivalent inductor and another end is grounded.

22. The anti-interference microwave detection module, as recited in claim 14, wherein the frequency-selection unit comprises a second equivalent capacitor, wherein the equivalent capacitor and the second equivalent capacitor are electrically connected with the equivalent inductor, wherein one end of the equivalent capacitor is electrically connected with the frequency-mixing wave detection unit and the other end of the equivalent capacitor is electrically connected with the feed point of the receiving unit, wherein one end of the equivalent inductor is electrically connected with the feed point of the receiving unit and the other end of the equivalent inductor is grounded.

23. The anti-interference microwave detection module, as recited in claim 22, wherein the equivalent inductor is a resistor.

24. The anti-interference microwave detection module, as recited in claim 22, wherein the frequency-selection unit further comprises a resistor electrically connected with the equivalent inductor in parallel.

25. The anti-interference microwave detection module, as recited in claim 24, wherein the frequency-selection unit further comprises a resistor which is electrically and sequentially connected with the second equivalent capacitor and the equivalent inductor in series.

26. The anti-interference microwave detection module, as recited in claim 25, wherein the equivalent inductor comprises a second equivalent inductor which is electrically connected between the first equivalent capacitor and the feed point is electrically connected with the first equivalent capacitor in series.

27. The anti-interference microwave detection module, as recited in claim 22, wherein the second equivalent capacitor which is electrically connected between the equivalent inductor and the feed point is electrically connected with the equivalent inductor in series.

28. The anti-interference microwave detection module, as recited in claim 27, wherein the frequency-selection unit comprises a second equivalent inductor, wherein the second equivalent inductor which is electrically connected between the equivalent inductor and the feed point is electrically connected with the equivalent capacitor in series.

29. The anti-interference microwave detection module, as recited in claim 14, wherein the equivalent capacitor is equivalently formed by a plurality of intervally spaced microstrip lines.

30. The anti-interference microwave detection module, as recited in claim 14, wherein the equivalent inductor is equivalently formed by a plurality of microstrip lines.

31. The anti-interference microwave detection module, as recited in claim 14, wherein the equivalent inductor is equivalently formed by a resistor.

32. The anti-interference microwave detection module, as recited in claim 14, wherein the oscillating circuit comprises a triode circuit processor, a first capacitor, a second capacitor, a third capacitor, a first resistor, and a second resistor, wherein the triode circuit processor has a first connection terminal, a second connection terminal, and a grounded third connection terminal, wherein the first capacitor is electrically connected between the first connection terminal and the second connection terminal of the triode circuit processor, wherein the second capacitor is electrically connected between the second connection terminal and the third connection terminal of the triode circuit processor, wherein the third capacitor is electrically connected between the first connection terminal and the third connection terminal of the triode circuit processor, wherein the second resistor is electrically connected between the first connection terminal and the second connection terminal of said triode circuit processor, wherein one end of said first resistor is electrically connected with the first connection terminal of the triode circuit processor so as to allow the oscillating circuit to provide the excitation signal at the second connection terminal of the triode circuit processor when the other end of the first resistor is powered in the oscillating circuit.

33. The anti-interference microwave detection module, as recited in claim 32, wherein the triode circuit processor is configured as a triode, wherein the first connection terminal is a collector of said triode, the second connection terminal is a base of said triode, and the third connection terminal is an emitter of said triode.

34. The anti-interference microwave detection module, as recited in claim 32, wherein the triode circuit processor is configured as a MOS transistor, wherein the first connection terminal is a drain electrode of said MOS transistor, the second connection terminal is a gate of said MOS transistor, and the third connection terminal is a source electrode of said triode.

35. The anti-interference microwave detection module, as recited in claim 32, further comprising a fluctuation signal conversion unit, electrically connected with the frequency-mixing wave detection unit and configured to convert the Doppler intermediate-frequency signal into a fluctuation signal based on a variation tendency of the Doppler intermediate-frequency signal, so that a characteristic parameter of a fluctuation of the fluctuation signal is corresponding to a characteristic of the movement of the at least one human body in the detection space.

36. The anti-interference microwave detection module, as recited in claim 35, wherein the fluctuation signal conversion unit is configured to satisfy that the frequency of said fluctuation signal converted by the fluctuation signal conversion unit is less than 50 Hz, wherein the fluctuation signal conversion unit is configured to be at least a Butterworth low pass filter.

37. The anti-interference microwave detection module, as recited in claim 14, wherein the oscillating circuit comprises a triode circuit processor, a first capacitor, a second capacitor, a third capacitor, a first resistor, a second resistor, a third resistor, and an inductor, wherein the triode circuit processor has a first connection terminal, a second connection terminal, and a third connection terminal, wherein the first capacitor is electrically connected between the first connection terminal and the third connection terminal of the triode circuit processor, wherein one end of the second capacitor is electrically connected the first connection terminal and the other end of the second capacitor is grounded, wherein one end of the third capacitor is grounded and the other end of the third capacitor is electrically connected to the second connection terminal, wherein the first resistor is electrically connected between the first connection terminal and the second connection terminal of the triode circuit processor, wherein one end of the second resistor is electrically connected with the second connection terminal of the triode circuit processor and the other end of the second resistor is grounded, wherein one end of the third resistor is electrically connected with the third connection terminal of the triode circuit processor and the other end of the third resistor is grounded, wherein one end of the inductor is electrically connected with the first connection terminal of the triode circuit processor so as to allow the oscillating circuit to provide the excitation signal at the third connection terminal of the triode circuit processor when the other end of the inductor is powered in the oscillating circuit.

38. The anti-interference microwave detection module, as recited in claim 37, wherein the triode circuit processor is configured as a triode, wherein the first connection terminal is a collector of said triode, the second connection terminal is a base of said triode, and the third connection terminal is an emitter of said triode.

39. The anti-interference microwave detection module, as recited in claim 37, wherein the triode circuit processor is configured as a MOS transistor, wherein the first connection terminal is a drain electrode of said MOS transistor, the second connection terminal is a grid of said MOS transistor, and the third connection terminal is a source electrode of said triode.

40. The anti-interference microwave detection module, as recited in claim 37, further comprising a fluctuation signal conversion unit, electrically connected with the frequency-mixing wave detection unit and configured to convert the Doppler intermediate-frequency signal into a fluctuation signal based on a variation tendency of the Doppler intermediate-frequency signal, so that a characteristic parameter of a fluctuation of the fluctuation signal is corresponding to a characteristic of the movement of the at least one human body in the detection space.

41. The anti-interference microwave detection module, as recited in claim 40, wherein the fluctuation signal conversion unit is configured to satisfy that the frequency of the fluctuation signal converted by the fluctuation signal conversion unit is less than 50 Hz, wherein the fluctuation signal conversion unit is configured to be at least a Butterworth low pass filter.

42. The anti-interference microwave detection module, as recited in claim 13, further comprising a fluctuation signal conversion unit, electrically connected with the frequency-mixing wave detection unit and configured to convert the Doppler intermediate-frequency signal into a fluctuation signal based on a variation tendency of the Doppler intermediate-frequency signal, so that a characteristic parameter of a fluctuation of the fluctuation signal is corresponding to a characteristic of the movement of the at least one human body in the detection space.

43. The anti-interference microwave detection module, as recited in claim 42, wherein the fluctuation signal conversion unit is configured to satisfy that the frequency of the fluctuation signal converted by the fluctuation signal conversion unit is less than 50 Hz.

44. The anti-interference microwave detection module, as recited in claim 43, wherein the fluctuation signal conversion unit is configured to be at least a Butterworth low pass filter.

45. The anti-interference microwave detection module, as recited in claim 43, further comprising:
- at least one amplification unit, arranged between the frequency-mixing wave detection unit and the fluctuation signal conversion unit, so as for amplifying the Doppler intermediate-frequency signal;
- an execution unit; and
- a control unit electrically connected between the execution unit and the fluctuation signal conversion unit, so as for receiving the fluctuation signal and controlling the execution unit according to the fluctuation signal.

* * * * *